United States Patent
Ukishima

(10) Patent No.: US 10,311,561 B2
(45) Date of Patent: Jun. 4, 2019

(54) IMAGE INSPECTION METHOD, IMAGE INSPECTION DEVICE, PROGRAM, AND IMAGE RECORDING SYSTEM

(71) Applicant: FUJIFILM Corporation, Tokyo (JP)

(72) Inventor: Masayuki Ukishima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/717,947

(22) Filed: Sep. 28, 2017

(65) Prior Publication Data

US 2018/0096472 A1 Apr. 5, 2018

(30) Foreign Application Priority Data

Sep. 30, 2016 (JP) .................. 2016-193973

(51) Int. Cl.
*G06T 7/00* (2017.01)
*B41J 2/155* (2006.01)
(Continued)

(52) U.S. Cl.
CPC ............. *G06T 7/0002* (2013.01); *B41J 2/155* (2013.01); *B41J 2/2139* (2013.01); *B41J 2/2146* (2013.01);
(Continued)

(58) Field of Classification Search
CPC ............................. B41J 29/393; B41J 11/002; B41J 2029/3935; B41J 2/205; B41J 2/21;
(Continued)

(56) References Cited

U.S. PATENT DOCUMENTS 5,966,222 A * 10/1999 Hirata .................. H04N 1/6033
358/518
5,987,161 A * 11/1999 Doane ..................... G06T 7/001
382/145
(Continued)

FOREIGN PATENT DOCUMENTS

JP 2012071474 4/2012
JP 2014066618 4/2014

OTHER PUBLICATIONS

"Search Report of European Counterpart Application", dated Feb. 12, 2018, pp. 1-12.

*Primary Examiner* — Aklilu K Woldemariam
(74) *Attorney, Agent, or Firm* — JCIPRNET

(57) ABSTRACT

The image inspection method includes: a step of acquiring data of an inspection image obtained by capturing an image of a recorded matter recorded by an image recording system that performs a compensation process of compensating for a defect caused by a failure in an image formation element, using an imaging apparatus; a step of acquiring data of a reference image; and a step of comparing the data of the inspection image with the data of the reference image to determine whether there is a defect at each position of the inspection image. The defect detection step includes a process that makes a defect detection performance different in a compensation application region and a compensation non-application region other than the compensation application region, on the basis of compensation position information of the failure in the image formation element to which the compensation process has been applied.

16 Claims, 11 Drawing Sheets

(51) Int. Cl.
*B41J 2/21* (2006.01)
*G06K 9/20* (2006.01)
*H04N 1/00* (2006.01)
*H04N 1/60* (2006.01)
*B41J 29/393* (2006.01)

(52) U.S. Cl.
CPC .............. *G06K 9/2063* (2013.01); *G06T 7/97* (2017.01); *H04N 1/00002* (2013.01); *H04N 1/6041* (2013.01); *B41J 2/2142* (2013.01); *B41J 2029/3935* (2013.01); *G06K 2209/19* (2013.01); *G06T 2207/10024* (2013.01); *G06T 2207/30108* (2013.01); *G06T 2207/30168* (2013.01)

(58) Field of Classification Search
CPC ...... B41J 2/2132; B41J 2/2139; B41J 2/2142; B41J 2/2146; B41J 2/155; G01N 21/8851; G01N 21/9054; G01N 21/9515; G01N 23/2204; G01N 23/225; G01N 21/956; G06K 9/38; G06K 2209/19; G06K 9/2063; G06T 2207/30141; G06T 2207/30144; G06T 5/50; G06T 7/001; G06T 7/11; G06T 7/12; G06T 7/136; G06T 7/155; G06T 7/174; G06T 2207/30108; G06T 2207/30168; G06T 7/0002; G06T 7/97; G06T 7/0014; G06T 2207/30148; G06T 7/74; G06T 2207/10024; H04N 1/4015; H04N 1/6033; H04N 1/605; H04N 13/275; H04N 1/00002; H04N 1/6041; H01J 2237/2441; H01J 2237/2817; H01J 2237/2487; H01J 37/26; H01J 2237/202; H01J 2237/2446; H01J 2237/2801; H01J 37/05; H01J 37/20; H01J 37/28; H01J 2237/24592; A61B 6/00; A61B 3/113; G02B 21/008; G02B 27/0179; G09G 3/006; G09G 3/2055; Y10S 977/881; A61F 9/00823; H01L 21/6833; H01L 2223/54466; G01J 3/02; G01J 3/0208; G01J 3/501; G01J 3/51; G01J 3/513; G01J 3/52; G01J 3/524; G03G 15/01; G03G 2215/00063; G03G 2215/00067
USPC ............... 382/254, 145, 149, 270, 309, 312; 347/14, 16, 19

See application file for complete search history.

(56) References Cited

U.S. PATENT DOCUMENTS

| | | | |
|---|---|---|---|
| 6,061,476 | A | 5/2000 | Nichani |
| 7,138,629 | B2* | 11/2006 | Noji ..................... G01N 23/225 250/311 |
| 2003/0058435 | A1* | 3/2003 | Honda ............... G01N 21/9501 356/237.1 |
| 2004/0057629 | A1 | 3/2004 | Shikami et al. |
| 2005/0045821 | A1* | 3/2005 | Noji ..................... G01N 23/225 250/311 |
| 2006/0171593 | A1* | 8/2006 | Hayakawa ............. G06T 7/001 382/209 |
| 2007/0126975 | A1* | 6/2007 | Choi ..................... G02F 1/1309 349/192 |
| 2007/0223802 | A1* | 9/2007 | Tateda .................... B29C 70/54 382/141 |
| 2007/0229420 | A1* | 10/2007 | Hwang ................. G09G 3/006 345/87 |
| 2009/0214104 | A1* | 8/2009 | Sugihara ................... G03F 1/84 382/145 |
| 2010/0149537 | A1* | 6/2010 | Myrick ..................... G01J 3/02 356/436 |
| 2010/0207983 | A1 | 8/2010 | Sasayama |
| 2012/0154837 | A1* | 6/2012 | Yamazaki .............. B41J 2/2142 358/1.9 |
| 2013/0265408 | A1* | 10/2013 | Yamaguchi ........... H01J 37/222 348/80 |
| 2014/0300656 | A1* | 10/2014 | Ueshima ..................... B41J 2/12 347/12 |
| 2016/0052300 | A1 | 2/2016 | Ueshima |
| 2016/0125583 | A1* | 5/2016 | Amanullah ............. G06T 7/001 348/87 |

\* cited by examiner

FIG. 9

|  | REFERENCE IMAGE | |
| --- | --- | --- |
|  | REGION IN VICINITY OF COMPENSATION POSITION | REGION OTHER THAN REGION IN VICINITY OF COMPENSATION POSITION |
| INSPECTION IMAGE — REGION IN VICINITY OF COMPENSATION POSITION | PATTERN 1 | PATTERN 2 |
| INSPECTION IMAGE — REGION OTHER THAN REGION IN VICINITY OF COMPENSATION POSITION | PATTERN 3 | PATTERN 4 |

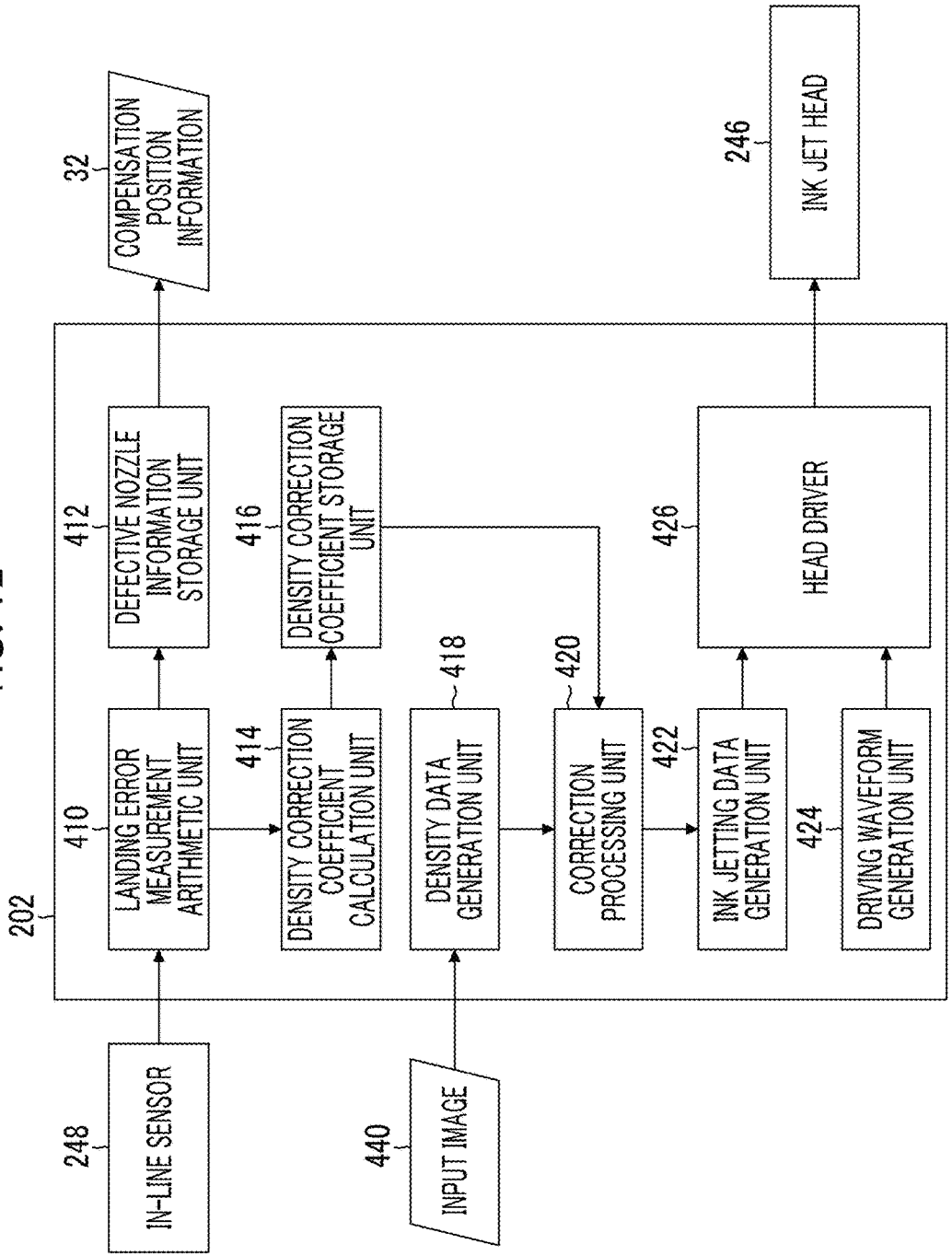

IMAGE INSPECTION METHOD, IMAGE INSPECTION DEVICE, PROGRAM, AND IMAGE RECORDING SYSTEM

CROSS-REFERENCE TO RELATED APPLICATIONS

The present application claims priority under 35 U.S.C. § 119 to Japanese Patent Application No. 2016-193973, filed on Sep. 30, 2016. The above application is hereby expressly incorporated by reference, in its entirety, into the present application.

BACKGROUND OF THE INVENTION

1. Field of the Invention

The present invention relates to an image inspection method, an image inspection device, a program, and an image recording system, and more particularly, to an image inspection technique that inspects an image defect of a recorded matter caused by a failure in an image formation element of an image recording system including a plurality of image formation elements.

2. Description of the Related Art

JP2014-66618A discloses an image inspection device that inspects an image printed on a printing medium. The image inspection device disclosed in JP2014-66618A includes: captured image data acquisition means for capturing a printed image printed on a printing medium and acquiring captured image data including the printed image; print data acquisition means for acquiring print data for printing the printed image on the printing medium; imaging correction data acquisition means for acquiring imaging correction data used for a captured image data density correction process; printing correction data acquisition means for acquiring printing correction data for a density correction process performed when the printed image is printed on the printing medium; registration information calculation means for calculating registration information for aligning the position of the printed image in the captured image data with the position of the printed image in the print data; integrated correction information calculation means for registering imaging system correction data based on the imaging correction data with printing system correction data based on the printing correction data on the basis of the registration information and calculating integrated correction information including the imaging system correction data and the printing system correction data; reference image data correction means for correcting one of the captured image data and the print data on the basis of the integrated correction information to create corrected reference image data; and inspection means for comparing the corrected reference image data with the other of the captured image data and the print data to perform inspection.

The registration information calculation means calculates registration information for aligning the positions of the printed images in the captured image data obtained by the captured image data acquisition means and the print data acquired by the print data acquisition means. The integrated correction information calculation means performs the registration between the imaging system correction data based on the imaging correction data acquired by the imaging correction data acquisition means and the printing system correction data based on the printing correction data acquired by the printing correction data acquisition means, on the basis of the registration information and calculates the integrated correction information including the imaging system correction data and the printing system correction data.

Therefore, even when there is a positional deviation between the print data and the captured image data obtained by the captured image data acquisition means, the integrated correction information is calculated such that the positions of the printed images are aligned with each other. The reference image data correction means corrects one of the captured image data and the print data on the basis of the integrated correction information and creates the corrected reference image data. The inspection means compares the corrected reference image data with the other of the captured image data and the print data to inspect the printed image. Since positional deviation is corrected in the integrated correction information, positional deviation is also corrected in the corrected reference image data. Even when positional deviation occurs in a printing medium, it is possible to accurately inspect the printed image. In addition, since the imaging correction data and the printing correction data are reflected the comparative reference image, it is not necessary to decrease a threshold value, considering correction, and it is possible to accurately inspect the printed image. The "printing medium" disclosed in JP2014-66618A is understood as the term corresponding to a "recording medium" in the specification.

SUMMARY OF THE INVENTION

An ink jet printing system disclosed in JP2014-66618A performs nozzle shading correction for uniformizing a variation in the jetting of a plurality of nozzles in a print head for information to be printed. In JP2014-66618A, in order to respond to the situation in which there is a difference in the amount of density correction in the nozzle shading correction during inspection, which causes a detection error, corrected reference image data, to which integrated correction information including a density correction process has been applied, is used as reference data to reduce the detection error.

However, in a case in which there is a defective nozzle, such as a non-jetting nozzle or a nozzle jetting ink droplets in a curved line, which is more abnormal than the variation in the jetting of the nozzle, the correction process becomes more complicated. Therefore, the method disclosed in JP2014-66618A which inspects the printed image on the basis of the corrected reference image data has the problem that it is difficult to sufficiently reduce a detection error.

<Problem of Streak Defect Caused by Defective Nozzle>

A line-head-type ink jet printing apparatus generally forms an image with one scanning operation using a line head. Therefore, when a defect occurs in a nozzle for any reason and the nozzle does not jet ink droplets or jets ink droplets in a curved line, a streak defect occurs in a portion in which the nozzle is in charge of recording. The streak defect occurs as a streak that extends in a scanning direction when the line head relatively scans a printing medium.

<Defective Nozzle Compensation Technique>

"Non-jetting correction" has been known as a process of compensating for the streak defect caused by the defective nozzle. Many non-jetting correction techniques have been proposed. For example, an example of the non-jetting correction technique is a technique disclosed in JP2012-71474A. The summary of the technique disclosed in JP2012-71474A is as follows. Non-jetting correction parameters corresponding to a difference between landing interference patterns are determined on the basis of the arrangement form of nozzles in a recording head and correspondence information indicating the correspondence relationship between each nozzle and a plurality of types of landing interference patterns corresponding to landing interference inducing factors including the landing order of liquid droplets which are defined from the direction in which the head and a jetted medium are moved relative to each other. Then, the non-jetting correction parameters are stored in a storage unit. When an image is output, a correction operation is performed for input image data, using the corresponding correction parameters, with reference to the non-jetting correction parameters, on the basis of non-jetting nozzle position information, to generate image data which is corrected such that the output of the non-jetting nozzle is compensated by nozzles other than the non-jetting nozzle. The "recording head" disclosed in JP2012-71474A is understood as the term corresponding to an ink jet head in the specification.

In addition, a defective nozzle which is not a non-jetting nozzle but is a nozzle jetting ink droplets in a curved line can be intentionally disabled from jetting ink droplets and non-jetting correction can be applied to perform compensation.

<Necessity for Streak Defect Inspection Function>

Even when the ink jet printing system has a defective nozzle compensation function such as a non-jetting correction function, it is difficult to completely prevent the occurrence of a streak. When a plurality of pages are printed, a defective nozzle is likely to occur unexpectedly in any page. In this case, a streak may occur in the page in which the defective nozzle occurs or in a plurality of pages after the defective nozzle occurs. In some cases, the page in which a streak occurs is not acceptable as a printed product. Therefore, it is preferable that the ink jet printing system has a streak defect inspection function which detects the occurrence of a streak and notifies a user as a client of the occurrence of the streak. Since a streak can occur at a local position on a printed matter, it is necessary to capture an image of the printed matter, using an imaging apparatus, such as a camera, and to perform image analysis to determine whether there is a streak.

<Compatibility Problems of Defective Nozzle Compensation Function and Streak Defect Inspection Function>

As described above, in general, the defective nozzle compensation function is performed by disabling a corresponding defective nozzle and increasing the recording density of neighboring nozzles. From a macro point of view, this is a state in which a white line component is present at a defective nozzle compensation position and a black line component is present in the vicinity of the defective nozzle compensation position. That is, a white line component in a portion compensated by the defective nozzle compensation function is microscopically a streak, but is not macroscopically viewed as a streak. In other words, the white line component is not a streak from the viewpoint of quality evaluation required for a printed matter.

It is important for the streak defect inspection function to detect a streak which is recognized by a client. Therefore, it is preferable that a micro streak component in a compensation application portion, which is not microscopically viewed as a streak, is determined not to be a streak.

However, a micro streak may be observed as a signal in a captured image obtained by capturing an image of a printed matter using an imaging apparatus. As a result, there is a problem that the micro streak is likely to be erroneously determined to be a streak.

The above-mentioned problem is not limited to the inspection of a streak defect in a printed matter that is printed by the line-head-type ink jet printing apparatus and is common to a technique that inspects a streak and other defects in a recorded matter which is recorded by an image recording system with a function of compensating for a failure in an image formation element.

The invention has been made in view of the above-mentioned problems and an object of the invention is to provide an image inspection method, an image inspection device, a program, and an image recording system that can prevent an error in the detection of a defect in a recorded matter subjected to a process of compensating for a failure in an image formation element.

In order to achieve the object, the following aspects of the invention are provided.

According to a first aspect of the present disclosure, there is provided an image inspection method comprising: an inspection image acquisition step of acquiring data of an inspection image obtained by capturing an image of a recorded matter recorded by an image recording system that comprises a plurality of image formation elements and performs a compensation process of compensating for a defect caused by a failure in the image formation element, using an imaging apparatus; a reference image acquisition step of acquiring data of a reference image which is a reference for detecting a defect in the recorded matter; and a defect detection step of comparing the data of the inspection image with the data of the reference image to determine whether there is a defect at each position of the inspection image. The defect detection step includes a process that makes a defect detection performance different in a compensation application region and a compensation non-application region other than the compensation application region, on the basis of compensation position information of the failure in the image formation element to which the compensation process has been applied.

The image formation element is an element for forming a dot which is the unit of recording when an image is formed. For example, in the case of an ink jet head, a nozzle that jets ink droplets corresponds to the image formation element. In the case of a thermal print head, a heating element corresponds to the image formation element. In the case of a light emitting diode (LED) print head, a light emitting diode corresponds to the image formation element.

The compensation process is a process that corrects the output of one image formation element or a plurality of image formation elements which are in charge of recording pixels in the vicinity of a defective image formation element in order to compensate for a defect caused by a failure in the image formation element. There is an image recording system that includes a plurality of image formation elements and has a compensation function which performs the compensation process for a failure in the image formation element. The image inspection method according to the first aspect is used to inspect a defect in a recorded matter recorded by the image recording system having the compensation function.

The compensation application region corresponds to a region in the vicinity of a compensation position including the position of a pixel recorded by a defective image formation element which has been compensated by the image recording system. The compensation application region includes the position of a pixel recorded by the image formation element of which the output has been corrected by the compensation process. The compensation non-application region is a region to which the compensation process is not applied and corresponds to a region other than the region in the vicinity of the compensation position.

According to the first aspect, the defect detection performance is different in the compensation application region and the compensation non-application region, considering the influence of the compensation process. Therefore, it is possible to achieve a defect detection process that prevents an error in the detection of a defect in the compensation application region.

The concept of the process that makes the detection performance different in the regions includes switching a defect detection method. In addition, the concept of the process that makes the detection performance different in the regions includes selecting whether to perform the detection process. For example, the concept includes performing the detection process such that the defect detection process is performed in the compensation non-application region and is not performed in the compensation application region.

According to a second aspect, in the image inspection method according to the first aspect, the detection performance may be defect detection accuracy determined by a combination of a correct detection performance that accurately determines a defect in the recorded matter and an erroneous detection avoidance performance that avoids erroneously determining a non-defect position of the recorded matter to be a defect. The defect detection step may include a process that sets the erroneous detection avoidance performance in the compensation application region to be higher than the erroneous detection avoidance performance in the compensation non-application region.

According to a third aspect, in the image inspection method according to the first or second aspect, in the defect detection step, a plurality of defect detection methods with different detection performances may be defined. The defect detection step may include a selection step of selecting a defect detection method to be applied to determine whether there is a defect at each position from the plurality of defect detection methods on the basis of the compensation position information.

According to a fourth aspect, in the image inspection method according to the third aspect, the defect detection method may include: a region determination step of determining an arithmetic region for extracting a signal which is suspected as a defect; a signal intensity determination step of determining intensity of the signal suspected as a defect from the arithmetic region determined in the region determination step; and a defect presence/absence determination step of determining whether there is a defect, on the basis of the intensity of the signal determined in the signal intensity determination step, using a threshold value. The plurality of defect detection methods may include defect detection methods in which at least arithmetic methods or parameters used in an arithmetic operation are different in at least one of the region determination step, the signal intensity determination step, or the defect presence/absence determination step.

According to a fifth aspect, in the image inspection method according to the fourth aspect, the plurality of defect detection methods may include defect detection methods in which the arithmetic regions determined in the region determination step have different sizes. Since the sizes of the arithmetic regions, that is, the sizes of the windows for an arithmetic operation are different from each other, different detection performances can be obtained.

According to a sixth aspect, in the image inspection method according to the fourth or fifth aspect, the plurality of defect detection methods may include defect detection methods in which arithmetic methods used for the arithmetic operation in the signal intensity determination step or the parameters used for the arithmetic operation in the signal intensity determination step are different from each other.

According to a seventh aspect, in the image inspection method according to any one of the fourth to sixth aspects, the plurality of defect detection methods may include defect detection methods in which the threshold values used in the defect presence/absence determination step are different from each other. Since the threshold values are different, different detection performances can be obtained.

According to an eighth aspect, in the image inspection method according to any one of the fourth to seventh aspects, the defect presence/absence determination step may include a statistical determination process that finally statistically determines whether there is a defect on the basis of a determination data group for a defect and a non-defect determined at a plurality of positions. Determination criteria of the statistical determination process are set to be different in the compensation application region and the compensation non-application region, on the basis of the compensation position information.

According to a ninth aspect, in the image inspection method according to any one of the third to eighth aspects, in a case in which a set of the compensation positions of the failure in the image formation element in the inspection image is a set T, a set of the compensation positions of the failure in the image formation element in the reference image is a set R, a set of positions that are included in the set T and the set R is a first position set, a set of positions that are included in the set T and are not included in the set R is a second position set, a set of positions that are not included in the set T and are included in the set R is a third position set, and a set of positions that are not included in the set T and the set R is a fourth position set, in the selection step, different defect detection methods may be selected for at least the second position set and the fourth position set.

According to the ninth aspect, in a case in which the reference image subjected to the compensation process is used, it is possible to achieve the defect detection process that prevents an error in the detection of a defect in the compensation application region.

According to a tenth aspect, in the image inspection method according to the ninth aspect, aspect, preferably among the plurality of defect detection methods, the defect detection method used for the second position set has a lower correct detection performance and a higher erroneous detection avoidance performance than the defect detection method used for the fourth position set.

According to an eleventh aspect, in the image inspection method according to any one of the first to tenth aspects, the image recording system may be a line-head-type ink jet printing system and the image formation element may be a nozzle of a line head.

According to a twelfth aspect, in the image inspection method according to the eleventh aspect, the compensation process of compensating for the failure in the image formation element may be a non-jetting correction process.

According to a thirteenth aspect, in the image inspection method according to any one of the first to twelfth aspects, the defect may be a streak defect.

According to a fourteenth aspect, in the image inspection method according to any one of the first to thirteenth aspects, the reference image may be generated by capturing an image of a reference image generating recorded matter, which has been recorded in advance by the image recording system or other image recording systems, using the imaging apparatus or other imaging apparatuses.

According to a fifteenth aspect, in the image inspection method according to any one of the first to thirteenth aspects, the reference image may be generated on the basis of image data that is used to record the recorded matter using the image recording system.

According to a sixteenth aspect, there is provided an image inspection device comprising: an inspection image acquisition unit that acquires data of an inspection image obtained by capturing an image of a recorded matter recorded by an image recording system that comprises a plurality of image formation elements and performs a compensation process of compensating for a defect caused by a failure in the image formation element, using an imaging apparatus; a reference image acquisition unit that acquires data of a reference image which is a reference for detecting a defect in the recorded matter; and a defect detection unit that compares the data of the inspection image with the data of the reference image to determine whether there is a defect at each position of the inspection image. The defect detection unit performs a process that makes a defect detection performance different in a compensation application region and a compensation non-application region other than the compensation application region, on the basis of compensation position information of the failure in the image formation element to which the compensation process has been applied.

In the image inspection device according to the sixteenth aspect, the same matters as those specified in the second to fifteenth aspects can be appropriately combined with each other. In this case, elements of the steps in the processes or operations specified in the image inspection method can be construed as elements of the processing units or means that are in charge of the functions of processes or operations corresponding to the processes or operations.

According to a seventeenth aspect, there is provided an image recording system comprising: a plurality of image formation elements; a compensation processing unit that performs a compensation process of compensating for a defect caused by a failure in the image formation element and reducing visibility of the defect; an imaging apparatus that captures an image of a recorded matter recorded by the image formation elements; an inspection image acquisition unit that acquires data of an inspection image obtained by capturing the image of the recorded matter using the imaging apparatus; a reference image acquisition unit that acquires data of a reference image which is a reference for detecting a defect in the recorded matter; and a defect detection unit that compares the data of the inspection image with the data of the reference image to determine whether there is a defect at each position of the inspection image. The defect detection unit performs a process that makes a defect detection performance different in a compensation application region and a compensation non-application region other than the compensation application region, on the basis of compensation position information of the failure in the image formation element to which the compensation process has been applied.

According to an eighteenth aspect, there is provided a program that causes a computer to perform: an inspection image acquisition step of acquiring data of an inspection image obtained by capturing an image of a recorded matter recorded by an image recording system that comprises a plurality of image formation elements and performs a compensation process of compensating for a defect caused by a failure in the image formation element, using an imaging apparatus; a reference image acquisition step of acquiring data of a reference image which is a reference for detecting a defect in the recorded matter; and a defect detection step of comparing the data of the inspection image with the data of the reference image to determine whether there is a defect at each position of the inspection image. The defect detection step includes a process that makes a defect detection performance different in a compensation application region and a compensation non-application region other than the compensation application region, on the basis of compensation position information of the failure in the image formation element to which the compensation process has been applied.

In the program according to the eighteenth aspect, the same matters as those specified in the second to fifteenth aspects can be appropriately combined with each other. In this case, elements, such as the processing units that are in charge of the processes or operations specified in the image inspection method can be construed as elements of the functions of the program that causes the computer to perform the steps in processes or operations corresponding to the processes or operations.

According to the invention, it is possible to prevent an error in the detection of a defect in a recorded matter which has been subjected to a process of compensating for a failure in an image formation element and to perform appropriate inspection.

BRIEF DESCRIPTION OF THE DRAWINGS

FIG. 9 is a table illustrating the patterns of a combination of a region in the vicinity of a compensation position and a region other than the region in the vicinity of the compensation position in the reference image and the inspection image.

FIG. 12 is a block diagram illustrating the functions of a control device related to image recording control.

DESCRIPTION OF THE PREFERRED EMBODIMENTS

Hereinafter, embodiments of the invention will be described in detail with reference to the accompanying drawings.

Here, an ink jet printing system which is an example of an image recording system will be described. A nozzle of an ink jet head in the ink jet printing system is an example of an image formation element. The ink jet printing system according to this embodiment has a non-jetting correction function that reduces the visibility of a defect caused by a defective nozzle. The non-jetting correction function is an example of a compensation function that performs a compensation process.

Before an image inspection function according to this embodiment is described, detailed examples of problems will be described.

[For Streak Defect in Line-head-type Ink Jet Printing Apparatus]

Figure 1:
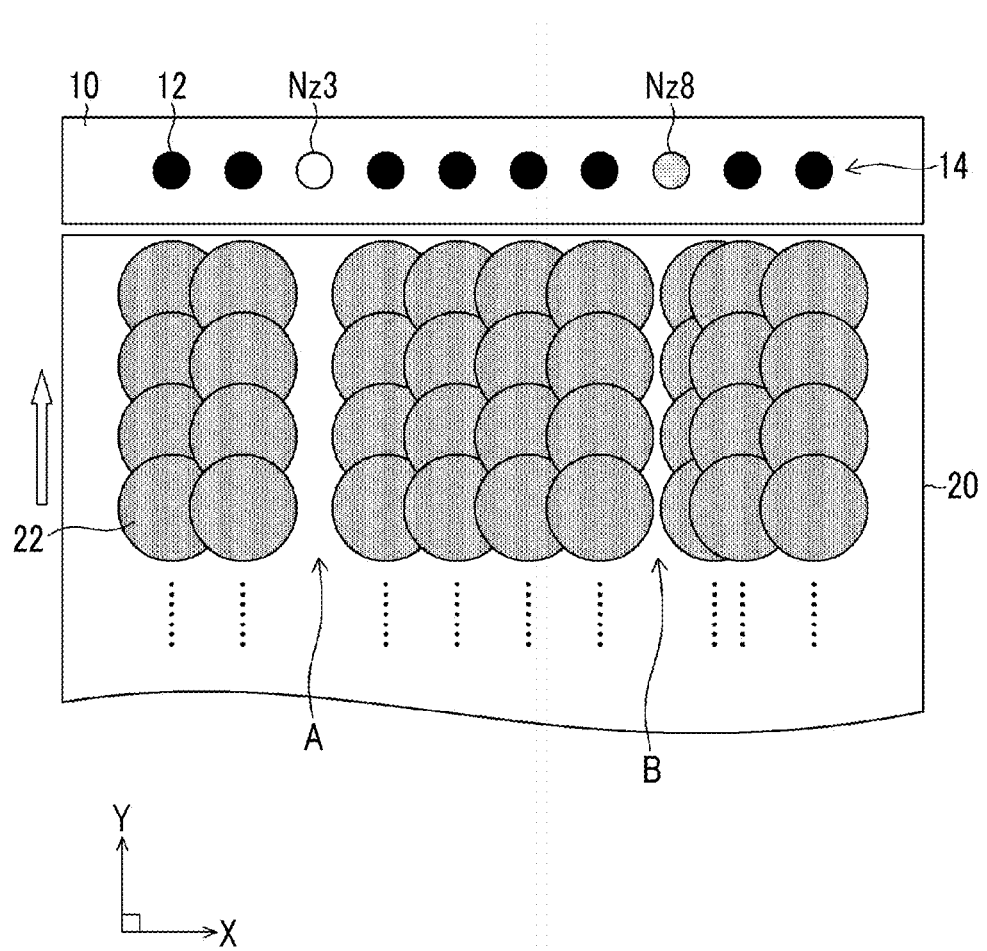
FIG. 1 is a diagram schematically illustrating a streak defect caused by a defective nozzle in a line-head-type ink jet printing apparatus.

FIG. 1 is a diagram schematically illustrating a streak defect caused by a defective nozzle in a line-head-type ink jet printing apparatus. The line-head-type ink jet printing apparatus means an ink jet printing apparatus including a line head. Here, for simplicity of explanation, a monochromatic gray image will be described as an example. In the case of a color image, the same process may be performed for each channel of each color. For example, in a case in which an inspection image obtained by capturing an image of a printed matter is an RGB image including gray image signals of red (R), green (G), and blue (B), the same process as that described in the case of the monochromatic gray image may be performed for each of color signal channels, such as an R channel, a G channel, and a B channel.

An image obtained by performing pre-processing, such as color conversion and/or gradation conversion, for a captured image in advance may be used as the inspection image. Alternatively, for example, a color image may be converted into a monochromatic gray image by any color conversion process and the same process may be performed for one channel of the monochromatic gray image 1. For example, an RGB image may be converted into a CIE L*a*b*image and the same process may be performed for one channel of an L*image indicating brightness information. CIE is an abbreviation of Commission Internationale de l'Eclairage. The CIE L*a*b*image is an image represented by an L*a*b* color system defined by the Commission Internationale de l'Eclairage.

A line head 10 is an ink jet head having a nozzle column 14 in which a plurality of nozzles 12 that jet ink in an ink jet manner are arranged. A medium 20 is transported with respect to the line head 10 and the nozzles 12 jet ink droplets. Then, the ink droplets are attached to the medium 20 and dots 22 are recorded.

It is assumed that a medium transport direction in which the medium 20 is transported with respect to the line head 10 is the Y direction and a medium width direction which is the width direction of the medium 20 perpendicular to the Y direction is the X direction. The plurality of nozzles 12 of the line head 10 are arranged in the X direction and each nozzle 12 records dots at different positions of the medium 20 in the X direction. In some cases, the X direction in which the nozzles 12 are arranged is referred to as a nozzle column direction.

The medium transport direction is a direction in which the line head 10 relatively scans the medium 20. In some case, the medium transport direction is referred to as a scanning direction. In some cases, the X direction is referred to as a scanning orthogonal direction. Here, the medium 20 is transported with respect to the line head 10 such that they are moved relative to each other. However, the line head 10 may be moved with respect to the medium 20 such that the line head 10 and the medium 20 are moved relative to each other.

FIG. 1 illustrates the nozzle column 14 in which 10 nozzles 12 are arranged. As an example of the defective nozzle, a third nozzle Nz3 that is the third from the left of FIG. 1 is a non-jetting nozzle. In addition, the curved flight of ink droplets occurs in an eighth nozzle Nz8 that is the eighth from the left. The non-jetting nozzle is a nozzle that is not capable of jetting ink. The curved flight is a phenomenon in which the jetting direction of a liquid droplet deviates and the position where a dot is to be actually formed deviates from an ideal position where the dot is to be formed. The ideal position where the dot is to be formed is a target position in terms of the design and indicates a dot formation position which is assumed in a case in which a normal nozzle jets liquid droplets.

In the case of the situation illustrated in FIG. 1, a streak defect that extends in the Y direction occurs at a position (a position represented by letter A in FIG. 1) on the medium 20 corresponding to the position of the third nozzle Nz3 which is a defective nozzle. In addition, a streak defect that extends in the Y direction occurs at a position (a position represented by letter B in FIG. 1) on the medium 20 corresponding to the position of the eighth nozzle Nz8 which is a defective nozzle. The streak defect indicates a streak-shaped image defect. The streak defect is synonymous with "streak unevenness" or a "streak-shaped defect". In the specification, in some cases, the streak defect is simply referred to as a "streak". Examples of the streak defect include a continuous streak and an intermittent streak.

In an ink jet printing apparatus using a single pass printing method that moves the medium 20 relative to the line head 10 and records an image with a prescribed recording resolution using one scanning operation, a streak defect that extends in the scanning direction occurs in a printed image due to a defective nozzle. The scanning direction in a case in which the medium is transported with respect to the line head such that the line head relatively scans the medium is a direction parallel to the transport direction of the medium. The direction in which the line head relatively scans the medium is referred to as a "line head relative scanning direction" or is simply referred to as a "scanning direction". The medium width direction perpendicular to the line head relative scanning direction is referred to as a "line head relative scanning orthogonal direction" or is simply referred to as a "scanning orthogonal direction".

[Defective Nozzle Compensation Technique]

Figure 2:
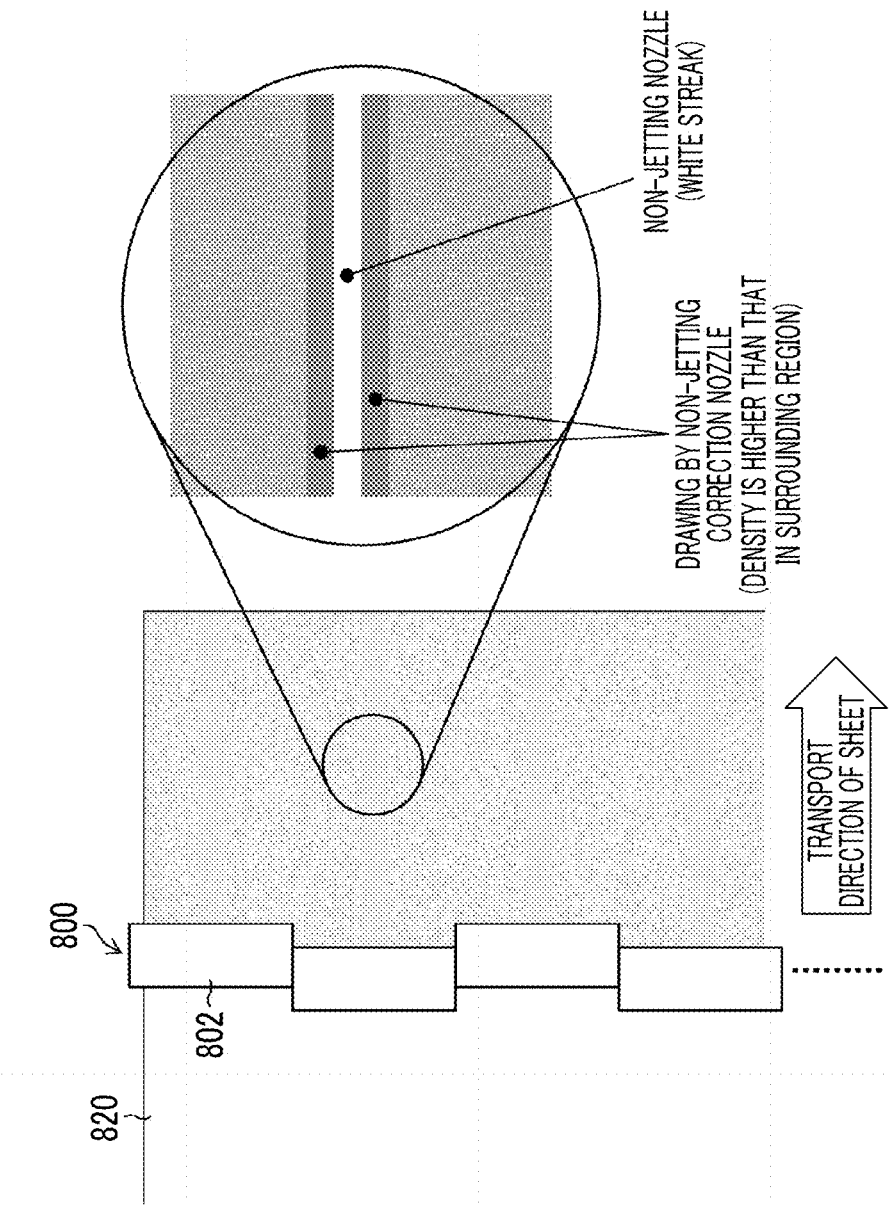
FIG. 2 is a conceptual diagram illustrating the basic concept of non-jetting correction.

FIG. 2 is a conceptual diagram illustrating the basic concept of non-jetting correction as a process of compensating for the streak defect caused by the defective nozzle described with reference to FIG. 1.

In many cases, the line-head-type ink jet printing apparatus that draws images using the single pass method uses the configuration of a print head 800 in which a plurality of head modules 802 are arranged in a sheet width direction perpendicular to the transport direction of a sheet 820, as shown in FIG. 2.

When a non-jetting nozzle occurs in the print head 800, a white streak occurs in a drawing region corresponding to the non-jetting nozzle. Therefore, at the time of non-jetting correction, the color of the image drawn by nozzles in the vicinity of the non-jetting nozzle is deepened to reduce the visibility of the white streak. A nozzle that is in the vicinity of the non-jetting nozzle and is used for correction is referred to as a "non-jetting correction nozzle". As a method for deepening the color of the image drawn by the non-jetting correction nozzle, for example, there are various means, such as (1) an output image correction method and (2) a correction method for increasing the intensity of a jetting signal to increase the diameter of a jetted dot. In a case in which the defective nozzle is not a non-jetting nozzle, but is a nozzle that jets liquid droplets in a curved line, the nozzle is disabled and non-jetting correction is performed. In this way, it is possible to stabilize image quality.

The term "disabling a nozzle" means a process of forcibly prohibiting the use of the nozzle. The disabled nozzle is in a state in which the nozzle is not capable of jetting liquid droplets and becomes a non-jetting nozzle. In other words, the term "disabling a nozzle" can be referred to as making a nozzle incapable of jetting liquid droplets or making a nozzle unavailable. Non-jetting correction is applied to the disabled nozzle.

<<Basic Approach of Streak Defect Inspection Function>>

A captured image of a printed matter, which is an inspection target, is referred to as an inspection image. In a case in which a streak occurs in a portion of the inspection image, a white line component that extends in the line head relative scanning direction on the image is observed. However, it is not easy to determine whether the line component is a streak or the content of the printed matter. Therefore, a basic approach is to prepare a reference image for comparison separately from the inspection image. The reference image is an image that is a reference for detecting a defect, such as a streak, from the inspection image.

It is considered that the white line component observed not from the reference image but from only the inspection image is likely to be a streak. A captured image of a printed matter without a streak and an input digital image input to the printing apparatus are used to obtain the reference image. Here, examples of the input digital image include a digital image that is input to the printing apparatus and an image that is generated during a process of applying any type of pre-processing, for example, at least one of a color conversion process, a density unevenness correction process, a streak defect correction process, or halftone processing which is performed until an image is actually printed.

In a case in which the reference image is generated from the captured image of the printed matter without a streak, the printed matter without a streak corresponds to a reference image generating recorded matter a. The imaging apparatus used to obtain the captured image of the printed matter without a streak may be an imaging apparatus provided in an image recording system or other imaging apparatuses such as a separate offline scanner.

<<Description of Problems>>

Here, the compatibility problems of a defective nozzle compensation function and a streak defect detection function will be described with reference to FIGS. 3 and 4.

Figure 3:
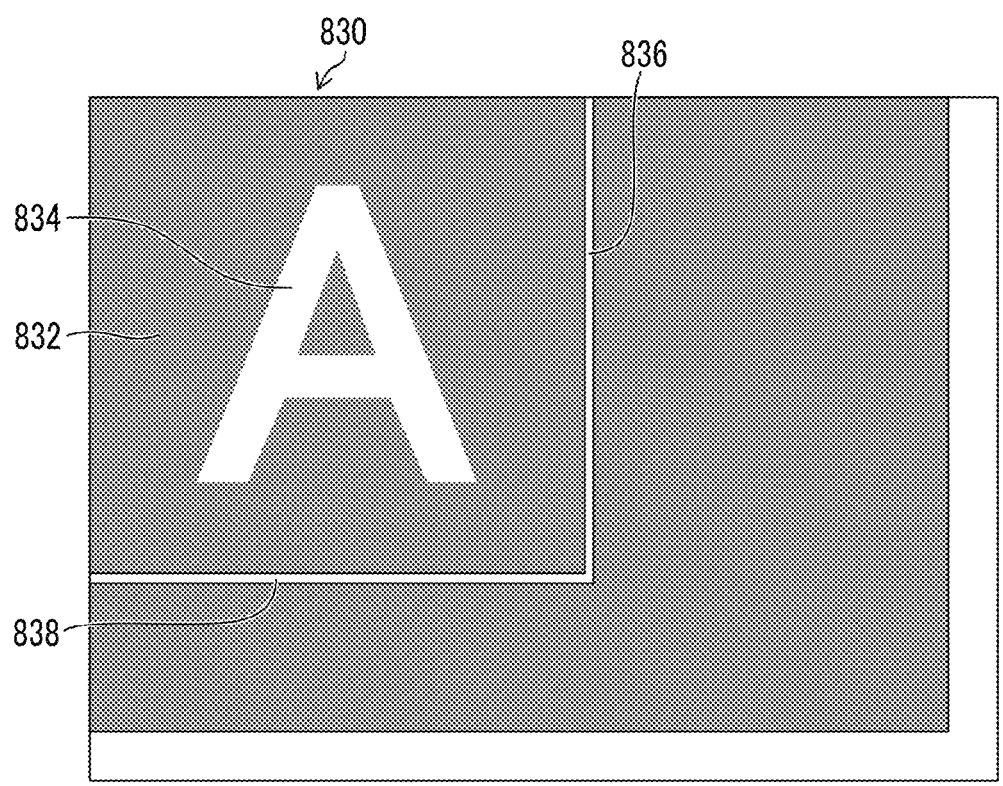
FIG. 3 is a diagram illustrating an example of data of a reference image.

FIG. 3 illustrates an example of data of the reference image. Here, a simple image is illustrated as an example. A reference image 830 includes a colored region 832 which is the background, a letter 834 as the content of the image, a vertical line 836, and a horizontal line 838.

Figure 4:
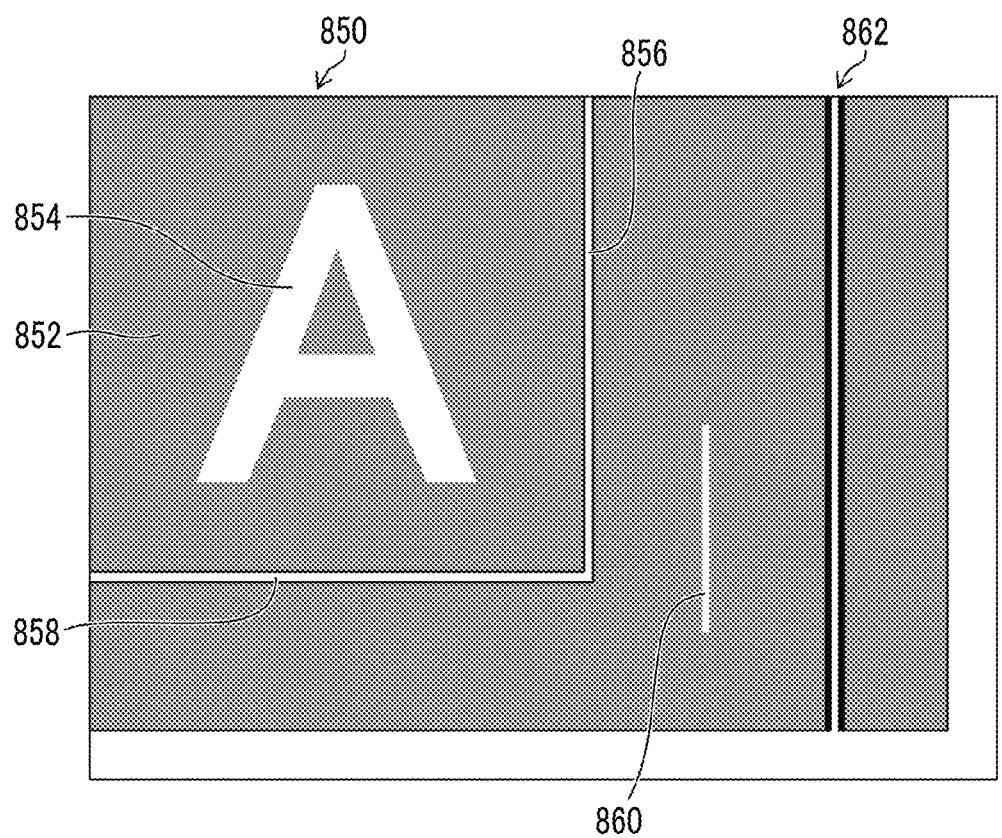
FIG. 4 is a diagram illustrating an example of data of an inspection image.

FIG. 4 illustrates an example of data of an inspection image. An inspection image 850 includes a colored region 852 which is the background, a letter 854 as the content of the image, a vertical line 856, and a horizontal line 858, similarly to the reference image 830. In addition, the inspection image 850 includes a streak defect 860 that is caused by a defective nozzle during drawing and a compensated portion 862 that is compensated by the defective nozzle compensation function of the ink jet printing system.

In FIG. 4, for ease of understanding of the compensated portion 862, the position of a defect corresponding to the position of a defective nozzle is represented by a white line and a compensation recording position by compensation nozzles close to the defective nozzle is represented by a black line. FIG. 4 illustrates an example in which a total of two nozzles that are adjacent to both sides of the defective nozzle, with the defective nozzle interposed therebetween, are used as the compensation nozzles. However, a nozzle range used for compensation is not limited to two adjacent nozzles. A total of four nozzles which are adjacent to both sides of the defective nozzle, with the defective nozzle interposed therebetween, and among which two nozzles are provided on each side of the defective nozzle, may be used as the compensation nozzles. Alternatively, a total of six nozzles, among which three nozzles are provided on each side of the defective nozzle, may be used as the compensation nozzles. A defective nozzle compensation position may be understood as an image position corresponding to the recording position of the defective nozzle. A compensation target region may be understood as an image region corresponding to a nozzle range including the defective nozzle and the compensation nozzles.

As shown in FIG. 4, a recording portion to which the defective nozzle compensation process has been applied microscopically has a white line component at the defective nozzle compensation position and has a black line component in the vicinity of the white line component. The white line component at the defective nozzle compensation position is microscopically a streak and is not macroscopically viewed as a streak.

The inspection image 850 captured by the imaging apparatus includes micro streak information in a compensation target region. Therefore, when a streak defect is inspected using image analysis, there is a problem that a micro streak caused by the compensation process for the compensation target region is likely to be erroneously determined to be a streak defect as an image defect.

It is difficult to conclude that a streak never occurs at the defective nozzle compensation position. For example, in a case in which correction parameters of neighboring compensation nozzles are not appropriate in the defective nozzle compensation function, it is difficult to perform correction until a streak is not viewed. As a result, a streak is viewed.

For example, when an unexpected nozzle defect occurs in neighboring compensation nozzles, a streak is viewed. Therefore, in general, it is preferable that the streak defect inspection process is also performed for the defective nozzle compensation position.

<<Outline of Image Inspection Function in Embodiment>>

One of the characteristics of the image inspection function in the embodiment of the invention is that, when a defect, such as a streak, on an image is inspected, "defect compensation position information is used" to improve the stability of defect inspection. The defect compensation position information means information indicating a position on the image which has been compensated by a defect compensation technique typified by a non jetting correction technique. Compensation position information for a non-jetting correction process may be the positional information of a defective nozzle.

<Defect Detection Accuracy>

Defect detection accuracy is determined by correct detection capability and erroneous detection avoidance capability. The correct detection capability is capability to accurately determine a defect. The erroneous detection avoidance capability is capability to avoid determining a non-defect position, which is not a defect, to be a defect. In general, a trade-off relationship is established between the correct detection capability and the erroneous detection avoidance capability. As the correct detection capability increases, the erroneous detection avoidance capability is likely to be reduced. As the erroneous detection avoidance capability increases, the correct detection capability is likely to be reduced. Whether priority is given to the correct detection capability or the erroneous detection avoidance capability may be determined according to an application. The defect detection accuracy is included in the concept of a defect detection performance. The term "capability" may be substituted with a "performance". That is, the defect detection performance is determined by a correct detection performance and an erroneous detection avoidance performance.

<Basic Concept of Image Inspection Function in Embodiment>

Examples of the defect that occurs in the inspection image include a defect that occurs "in a region in the vicinity of a compensation position" and a defect that occurs in a region "other than the region in the vicinity of the compensation position". The region in the vicinity of the compensation position is a range including the recording position of the defective nozzle to be subjected to the compensation process and the vicinity of the recording position. The range of the "vicinity" includes a compensation recording range of the compensation nozzle. The region in the vicinity of the compensation position may be substituted with the term "compensation application region". The region other than the region in the vicinity of the compensation position indicates a range other than the "vicinity of the compensation position". The region other than the region in the vicinity of the compensation position corresponds to a region other than the compensation application region and can be substituted with the term "compensation non-application region".

In a case in which the same defect detection method is applied to the "region in the vicinity of the compensation position" and the region "other than the region in the vicinity of the compensation position" in the inspection image to inspect a defect during the inspection of a defect, in the "region in the vicinity of the compensation position", the erroneous detection avoidance capability tends to be lower than that in the region "other than the region in the vicinity of the compensation position" except a case in which the defect is physically completely compensated.

In a case in which adjustment for increasing the erroneous detection avoidance capability is performed for the inspection method, the correct detection capability for a region including the region "other than the region in the vicinity of the compensation position" decreases.

For this reason, in this embodiment, adjustment for reducing the correct detection capability and increasing the erroneous detection avoidance capability only in the "region in the vicinity of the compensation position" is performed using the defect compensation position information. Therefore, it is possible to increase the overall erroneous detection avoidance capability while maintaining the correct detection capability in the region "other than the region in the vicinity of the compensation position". As a result, it is possible to improve the stability of defect inspection.

The following embodiment is one of the specific examples based on the above-mentioned basic concept. Other execution methods may be used according to the basic concept.

<<Basic Configuration of Streak Defect Inspection Method in Embodiment>>

Figure 5:
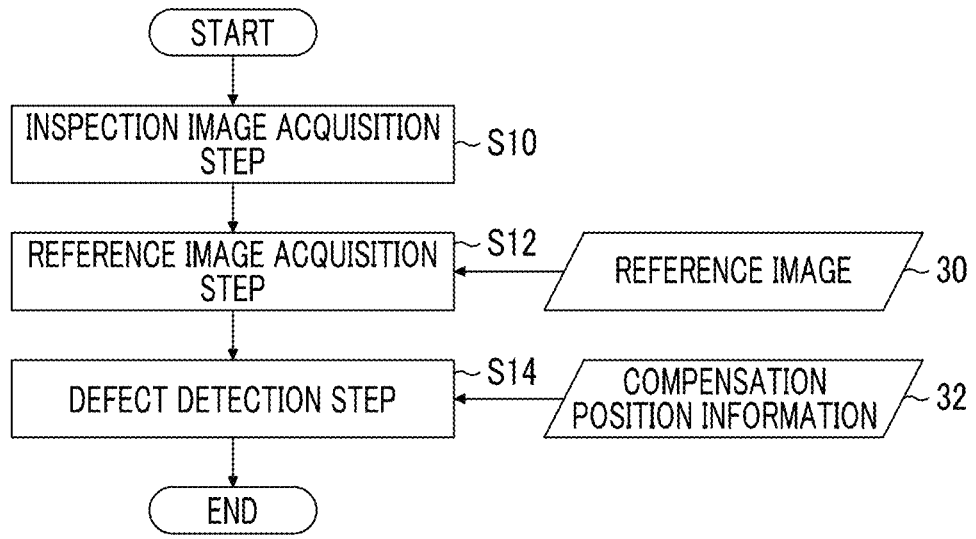
FIG. 5 is a flowchart illustrating the basic configuration of a streak defect inspection method according to an embodiment.

A streak defect will be described as an example of the image defect. A streak defect inspection method is an example of the image inspection method. FIG. 5 illustrates the basic configuration of the streak defect inspection method.

The streak defect inspection method according to the embodiment shown in FIG. 5 includes an inspection image acquisition step (Step S10), a reference image acquisition step (Step S12), and a defect detection step (Step S14). For example, a computer functioning as the image inspection device can execute a program to perform the process from Step S10 to Step S14.

First, in Step S10, the image inspection device acquires an inspection image obtained by capturing an image of a printed matter, which is an inspection target, using the imaging apparatus (inspection image acquisition step). A step in which the imaging apparatus captures the image of the printed matter to generate digital image data which is the captured image (imaging step) is performed by the imaging apparatus before the inspection image acquisition step. In a case in which the image inspection device includes the imaging apparatus, the imaging step may be understood as a portion of the inspection image acquisition step.

Then, in Step S12, the image inspection device acquires data of a reference image 30 which has been created in advance (reference image acquisition step). It is preferable that the data of the reference image 30 is stored in a storage device, such as a memory, provided in the image inspection device or a storage device of an external apparatus. In the reference image acquisition step of Step S12, the image inspection device reads the data of the reference image 30 from the storage device. In addition, the order in which the inspection image acquisition step of Step S10 and the reference image acquisition step of Step S12 are performed may be reversed.

Then, in Step S14, the image inspection device compares the inspection image with the reference image, using image processing, to determine whether there is a streak defect (defect detection step). In the defect detection step of Step S14, defective nozzle compensation position information 32 is used.

<How to Use Compensation Position Information>

In the streak defect inspection method according to this embodiment, in the defect detection step (Step S14) based on the above-mentioned basic concept, a process that switches a defect detection method in the region in the vicinity of the compensation position acquired from the compensation position information 32 and at a position other than the region in the vicinity of the compensation position is performed. The concept of "switching the defect detection method" includes changing some or all of the parameters used for an arithmetic operation for detecting a defect and changing a portion of or the entire arithmetic algorithm. The concept of the "arithmetic operation" for detecting a defect includes at least one of signal processing or a determination process.

The concept of "switching the defect detection method" includes switching between the execution of the defect detection process and the non-execution of the defect detection process. The configuration in which the streak detection process is not performed in the region in the vicinity of the compensation position and is performed only at the position other than the region in the vicinity of the compensation position is included in an example of the configuration in which the defect detection method is switched between the region in the vicinity of the compensation position and the position other than the region in the vicinity of the compensation position. The process of switching the defect detection method corresponds to an example of a process that makes the detection performance different in the two regions.

<Example of Sub-Configuration of Defect Detection Step>

Figure 6:
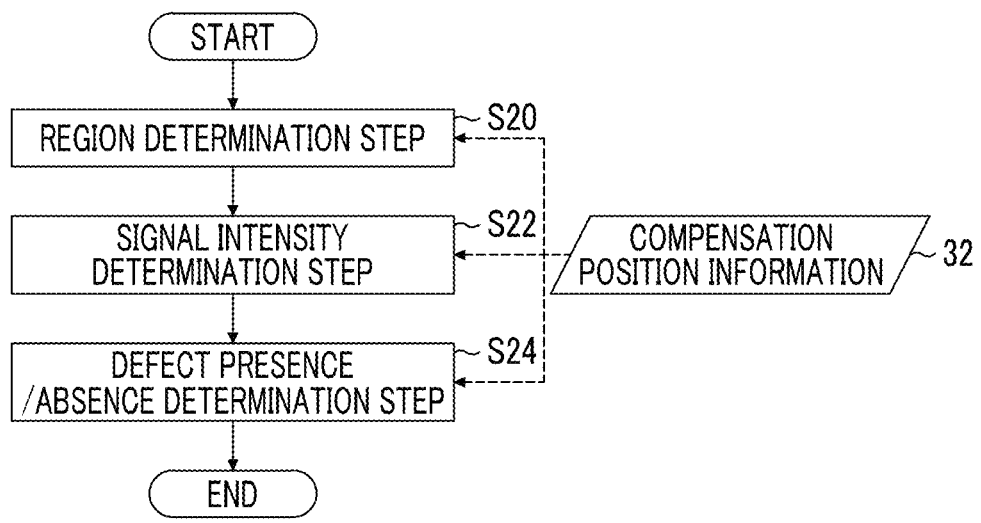
FIG. 6 is a flowchart illustrating an example of the sub-configuration of a streak defect detection step.

FIG. 6 is a flowchart illustrating an example of the sub-configuration of the streak defect detection step. The defect detection step (Step S14 in FIG. 5) includes a region determination step (Step S20), a signal intensity determination step (Step S22), and a defect presence/absence determination step (Step S24).

In the region determination step (Step S20), when the image inspection device determines whether there is a streak at each position of the inspection image, an arithmetic region which is a partial region, in which the presence or absence of the streak is detected, in the vicinity of the position is determined. In the region determination step (Step S20), an arithmetic region for extracting a signal suspected as a defect is determined.

In a case in which the line head relative scanning direction is the Y direction and the scanning orthogonal direction perpendicular to the line head relative scanning direction is the X direction, a streak becomes a signal having a peak-shaped profile in the X direction. The streak has a certain length in the Y direction. Therefore, when the profile in the Y direction is observed at the peak position in the X direction, the peak signal has a duration corresponding to the length of the streak. Strictly, in some cases, the streak position is a row of isolated points which are discretely arranged in the Y direction.

It is necessary to analyze a region with a certain width in the X direction in order to recognize the shape of the peak of the signal in the X direction. In addition, it is necessary to analyze a region with a certain width in the Y direction in order to determine whether the signal is a streak or a single isolated point.

In the region determination step of Step S20, the image inspection device determines the width of an arithmetic region, from which a streak is to be detected, in the X direction and the width of the arithmetic region in the Y direction at each position of the inspection image.

Then, in the signal intensity determination step (Step S22), the image inspection device compares each arithmetic region at each position of the inspection image which has been determined in the region determination step (Step S20) with the same region of the reference image, using image processing, to determine the intensity of a signal, which is suspected as a defect, at the position of the inspection image.

In a case in which there is a signal suspected as a defect only in the inspection image, the intensity of the signal is high. In the other cases, the intensity of the signal is low. There are various methods as the comparison method using image processing. For example, in the case of a streak, a method is considered which statistically processes a difference image between the inspection image and the reference image in the Y direction to obtain a profile, searches for a peak position in the profile, and calculates the intensity of the peak. Examples of the statistical processing include a total sum, a mean, a median, a maximum value, a minimum value, and appropriate combinations thereof. The comparison method is not limited to the method using the intensity of the peak. For example, a method is considered which calculates the area of a peak profile with a shaped in which there is a little width between a peak position and the left and right ends in the X direction. The calculated value of the signal indicates the intensity of the signal suspected as a defect and can be referred to as a defect intensity signal.

Each of the inspection image and the reference image is likely to include noise, which causes a variation in the calculation result of the intensity of the defect. Therefore, a noise reduction process may be performed for the image or profile of the inspection image and/or the reference image in advance, using a blur filter or an order statistic filter.

Then, in the defect presence/absence determination step (Step S24), the image inspection device determines whether the signal is a defect or not, on the basis of the intensity of the signal suspected as a defect which has been determined in the signal intensity determination step (Step S22). As an example of the determination method, there is a method which uses a threshold value that has been prepared in advance, determines a signal to be a defect when the intensity of the signal is greater than the threshold value, and determines the signal not to be a defect when the intensity of the signal is equal to or less than the threshold value.

As the threshold value becomes smaller, it is possible to detect a smaller defect, but the probability of a non-defective portion being erroneously detected as a defect becomes higher. In contrast, as the threshold value becomes larger, the probability of erroneous detection becomes lower, but the probability that no defect will be detected becomes higher. Therefore, it is important to set the threshold value to a minimum value in the range in which erroneous detection does not occur.

In the defect presence/absence determination step (Step S24), whether there is a defect may be finally statistically determined on the basis of a determination data group indicating the results of determining whether the signal is a defect or not at a plurality of positions. For example, in the case of a streak, after it is determined whether there is a defect at intervals of 5 millimeters in the Y direction, determination data for 15 consecutive millimeters (that is, there are three determination results for every 5 millimeters) may be acquired using a majority rule and whether there is a defect may be finally determined. The determination process using the statistical determination method is referred to as a statistical determination process. The determination process using the majority rule is an example of the statistical determination process.

<Example of Usage of Compensation Position Information in Example of Sub-Configuration of Defect Detection Step>

The compensation position information can be used in each of the region determination step (Step S20), the signal intensity determination step (Step S22), and the defect presence/absence determination step (Step S24). In addition, the compensation position information may be used in any one of the region determination step (Step S20), the signal intensity determination step (Step S22), and the defect presence/absence determination step (Step S24) or may be used in a plurality of steps among these steps.

An example in which the compensation position information is used in the region determination step (Step S20) will be described. A method is considered which sets the arithmetic region determined in the region determination step (Step S20) in the region in the vicinity of the compensation position to be wider than that in the region other than the region in the vicinity of the compensation position. In particular, since a streak defect is a defect that extends in the Y direction, the region in the Y direction may be widened. In general, in the region in the vicinity of the compensation position, the spatial frequency of a signal is higher than that in the region other than the region in the vicinity of the compensation position and the number of noise components is larger than that in the region other than the region in the vicinity of the compensation position. In this case, the arithmetic region is widened such that the determination can be performed with a large amount of data. As a result, robustness against noise is improved.

An example in which the compensation position information is used in the signal intensity determination step (Step S22) will be described. For example, a method is considered which more strongly performs the noise reduction process using the blur filter or the order statistic filter in the region in the vicinity of the compensation position than that in the region other than the region in the vicinity of the compensation position. Alternatively, the on and off states of the noise reduction process are switched. The "ON" state of the noise reduction process means that the noise reduction process is applied to perform processing. The "OFF" state of the noise reduction process means that the noise reduction process is not applied and processing is not performed. In addition, the on and off states of the noise reduction process are switched such that the noise reduction process is turned on in the region in the vicinity of the compensation position and is turned off in the region other than the region in the vicinity of the compensation position. In this case, it is possible to improve robustness against noise in the region in the vicinity of the compensation position.

An example in which the compensation position information is used in the defect presence/absence determination step (Step S24) will be described. For example, a method is considered which sets the threshold value in the region in the vicinity of the compensation position to be greater than that in the region other than the region in the vicinity of the compensation position. In the region in the vicinity of the compensation position, a situation is likely to occur in which a non-defective portion is erroneously determined to be a defect. Therefore, when the threshold value is set to a large value in the region in the vicinity of the compensation position, it is possible to prevent an increase in the probability of erroneous detection in the region in the vicinity of the compensation position while reducing the probability that a defect will not be detected in the region other than the region in the vicinity of the compensation position.

As one of extreme examples, a process of certainly determining that there is "no defect" in the region in the vicinity of the compensation position may be used. The configuration in which it is always determined that there is "no defect" in the region in the vicinity of the compensation position can be implemented by the setting of the threshold value. For example, a value that is greater than the assumed maximum value of the signal obtained in the signal intensity determination step (Step S22) is set to the threshold value. In this case, it is always determined that there is "no defect". In addition, for example, a configuration in which a series of defect detection processes described in Steps S20 to S24 in FIG. 6 is omitted and it is definitely determined that there is "no defect" in the region in the vicinity of the compensation position may be used.

In addition, there is a method which uses the configuration, in which whether there is a defect is finally statistically determined on the basis of a determination data group indicating the results of determining whether a signal is a defect or not at a plurality of positions, in the defect presence/absence determination step (Step S24), acquires a large number of data groups used for the statistical determination process in the region in the vicinity of the compensation position, and improve robustness. Furthermore, there is the following method. In the example of a streak defect, for example, in the region other than the region in the vicinity of the compensation position, after it is determined whether there is a defect at intervals of 5 millimeters in the Y direction, determination data for 15 consecutive millimeters (that is, there are three determination results for every 5 millimeters) is acquired using a majority rule and whether there is a defect is finally determined. In contrast, in the region in the vicinity of the compensation position, after it is determined whether there is a defect at intervals of 5 millimeters in the Y direction, determination data for 25 consecutive millimeters (that is, there are five determination results for every 5 millimeters) is acquired using the majority rule and whether there is a defect is finally determined. Further, there are various variations. For example, in the region in the vicinity of the compensation position, after it is determined whether there is a defect at intervals of 10 millimeters in the Y direction, determination data for 30 consecutive millimeters (that is, there are three determination results for every 10 millimeters) is acquired using the majority rule and whether there is a defect is finally determined.

The above-mentioned variations are examples in which criteria for the statistical determination process in the region in the vicinity of the compensation position and in the region other than the region in the vicinity of the compensation position are different from each other.

<Flow of Defect Detection Process>

Figure 7:
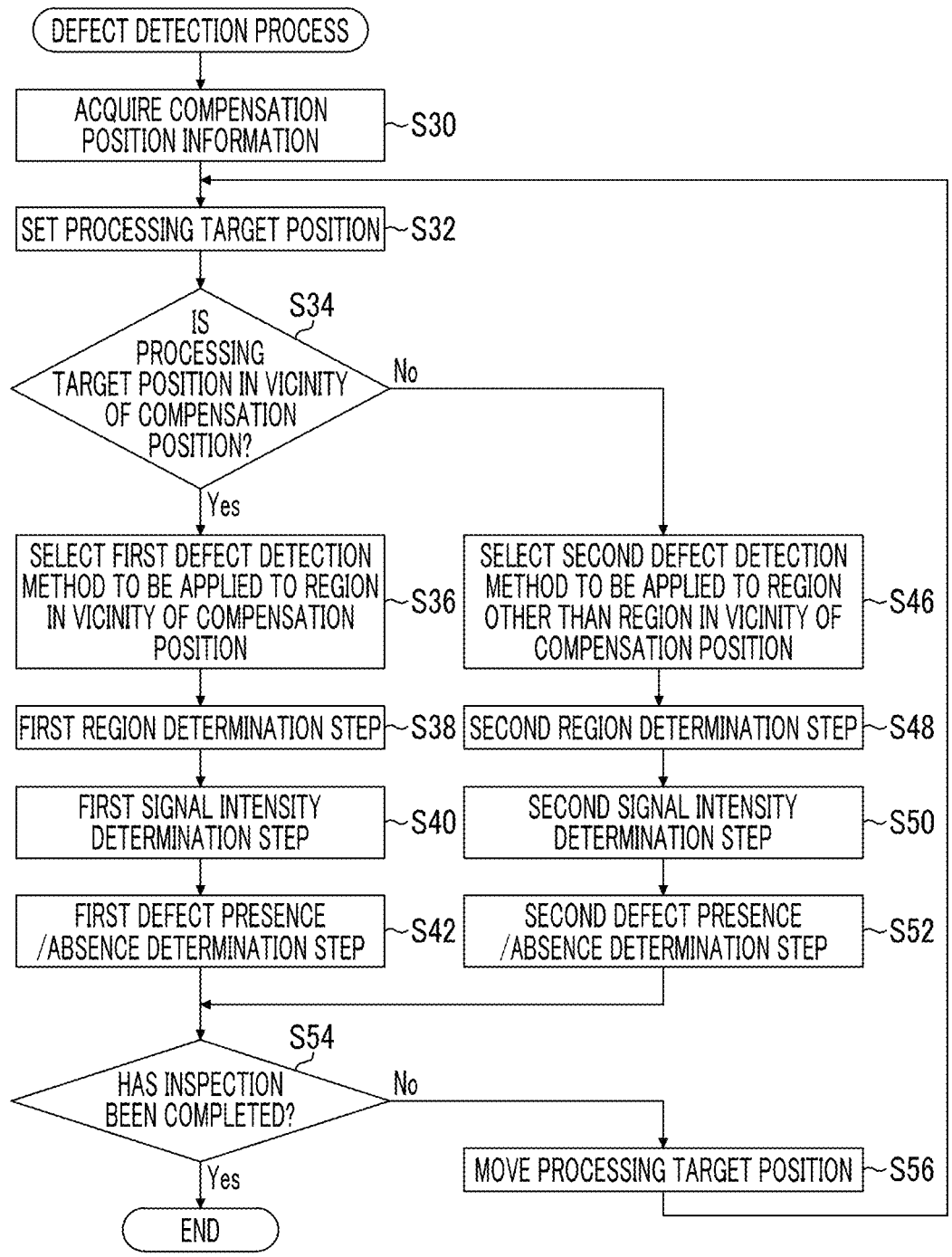
FIG. 7 is a flowchart illustrating an example of a process in a defect detection step.

FIG. 7 is a flowchart illustrating an example of the process in the defect detection step. The computer that functions as the image inspection device executes a program to implement each step of the flowchart shown in FIG. 7.

When the defect detection process starts, the image inspection device acquires compensation position information in Step S30. In this example, the compensation position information is correction position information indicating the position of an image to which the non-jetting correction process has been applied by the non-jetting correction function of the ink jet printing system. The correction position information may be defective nozzle information indicating the position of a defective nozzle subjected to the non-jetting correction process. The position of the defective nozzle can be specified by an ink color and a nozzle number.

The ink jet printing system has a nozzle inspection function that inspects the jetting state of each nozzle in the ink jet head and includes a defective nozzle information storage unit that stores information of a defective nozzle specified by the nozzle inspection function. The nozzle inspection function may be, for example, a function that outputs a test chart which is called a ladder pattern, performs image analysis for the output result, and specifies a defective nozzle. The ladder pattern is a line pattern in which lines formed by a continuous jetting operation of each nozzle which is performed by so-called "1-on n-off" jetting control for a nozzle column of the ink jet head are arranged. A technique for specifying a defective nozzle is not limited to the method using the test chart. For example, there is a method which captures the flying state of liquid droplets jetted from the nozzle, using a camera.

In Step S32, the image inspection device sets a processing target position on the inspection image. The processing target position is the position of the image of interest to be subjected to the defect detection process. The defect detection process of the image inspection method according to this embodiment determines whether there is a defect at each processing target position while sequentially moving the processing target position on the inspection image.

In Step S34, the image inspection device determines whether the processing target position corresponds to the vicinity of the compensation position. In a case in which the processing target position corresponds to the vicinity of the compensation position, the determination result in Step S34 is "Yes" and the process proceeds to Step S36.

In Step S36, the image inspection device selects a first defect detection method to be applied to the region in the vicinity of the compensation position and performs Step S38, Step S40, and Step S42.

A first region determination step (Step S38) is an aspect of a processing step of the region determination step described as Step S20 in FIG. 6. In the first region determination step, a region determination process applied to the processing target position in the region in the vicinity of the compensation position is performed.

A first signal intensity determination step (Step S40) shown in FIG. 7 is an aspect of a processing step of the signal intensity determination step described as Step S22 in FIG. 6. In the first signal intensity determination step, a signal intensity determination process applied to the processing target position in the region in the vicinity of the compensation position is performed.

A first defect presence/absence determination step (Step S42) shown in FIG. 7 is an aspect of a processing step of the defect presence/absence determination step described as Step S24 in FIG. 6. In the first defect presence/absence determination step, a defect presence/absence determination process applied to the processing target position in the region in the vicinity of the compensation position is performed.

In a case in which the processing target position does not correspond to the region in the vicinity of the compensation position, that is, the processing target position corresponds to the region other than the region in the vicinity of the compensation position in Step S34, the process proceeds to Step S46.

In Step S46, the image inspection device selects a second defect detection method to be applied to the region other than the region in the vicinity of the compensation position and performs Step S48, Step S50, and Step S52.

A second region determination step (Step S48) is an aspect of a processing step of the region determination step described as Step S20 in FIG. 6. In the second region determination step, a region determination process applied to the processing target position in the region other than the region in the vicinity of the compensation position is performed.

A second signal intensity determination step (Step S50) shown in FIG. 7 is an aspect of a processing step of the signal intensity determination step described as Step S22 in FIG. 6. In the second signal intensity determination step, a signal intensity determination process applied to the processing target position in the region other than the region in the vicinity of the compensation position is performed.

A second defect presence/absence determination step (Step S52) shown in FIG. 7 is an aspect of a processing step of the defect presence/absence determination step described as Step S24 in FIG. 6. In the second defect presence/absence determination step, a defect presence/absence determination process applied to the processing target position in the region other than the region in the vicinity of the compensation position is performed.

After Step S42 or Step S52, in Step S54, the image inspection device determines whether the inspection of the entire region of the inspection image has been completed. In a case in which there is an image position that has not been inspected, the image inspection device proceeds to Step S56, moves the processing target position to the image position that has not been inspected, and returns to Step S32.

In contrast, when the inspection of the entire region of the inspection image has been completed and the determination result in Step S54 is "Yes", the image inspection device ends the process shown in the flowchart of FIG. 7.

Step S34 and the process of selecting Step S36 or Step S46 on the basis of the determination result in Step S34 correspond to an example of a selection step.

<Functional Block Diagram of Image Inspection Device>

Figure 8:
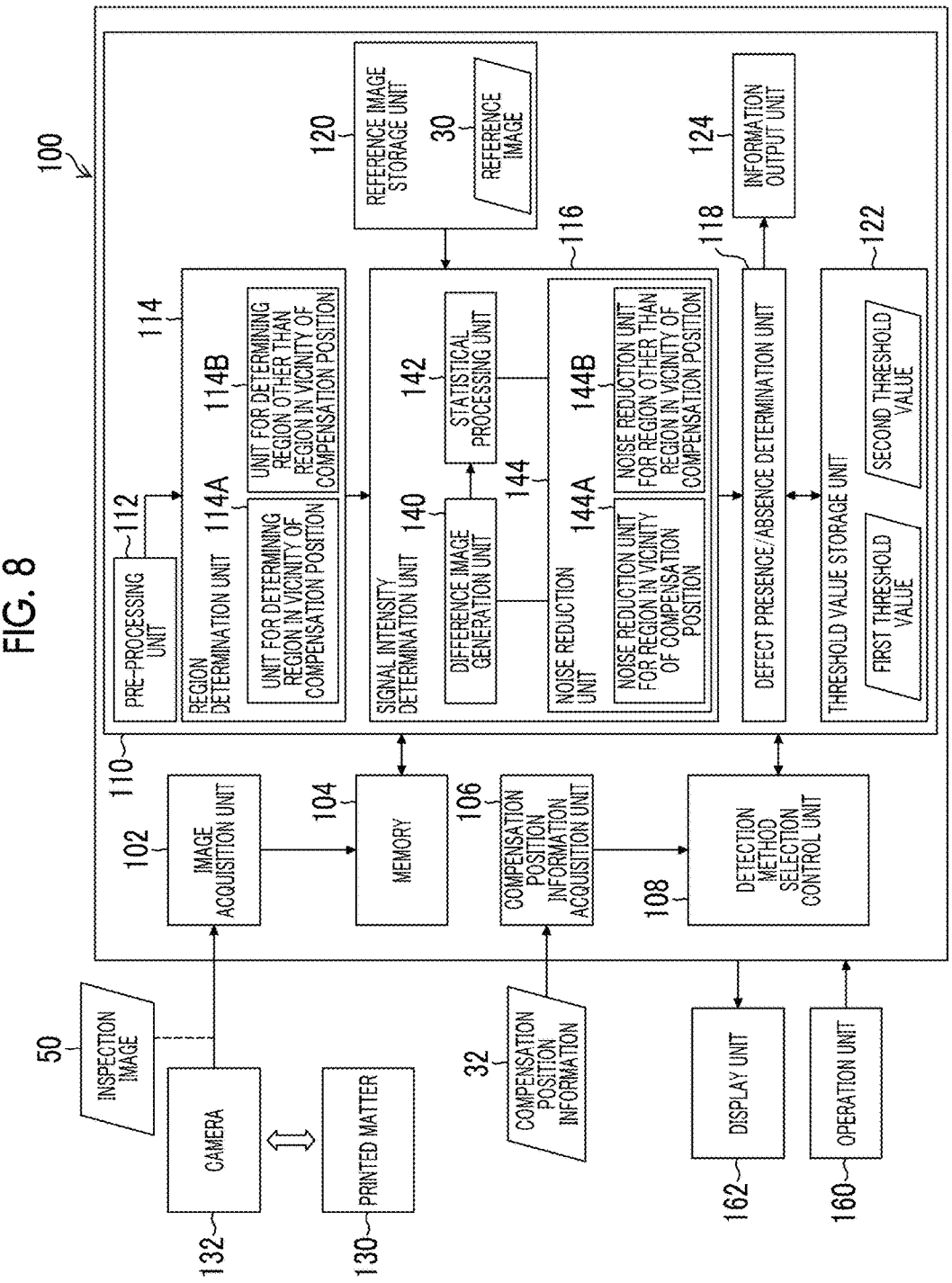
FIG. 8 is a block diagram illustrating the functions of an image inspection device according to the embodiment.

Next, the configuration of the image inspection device according to the embodiment will be described. FIG. 8 is a block diagram illustrating the functions of an image inspection device 100 according to the embodiment. The image inspection device 100 can perform the above-mentioned image inspection method according to the embodiment.

The image inspection device 100 includes an image acquisition unit 102, a memory 104, a compensation position information acquisition unit 106, a detection method selection control unit 108, and an image analysis unit 110. The image analysis unit 110 includes a pre-processing unit 112, a region determination unit 114, a signal intensity determination unit 116, a defect presence/absence determination unit 118, a reference image storage unit 120, a threshold value storage unit 122, and an information output unit 124. In addition, the image analysis unit 110 may include an arithmetic unit (not illustrated), a processing unit (not illustrated), a storage unit (not illustrated), a control unit (not illustrated) or appropriate combinations thereof, in addition to the components shown in FIG. 8.

The function of each unit of the image inspection device 100 may be implemented by a combination of hardware and software of a computer. Software is synonymous with a program. For example, the detection method selection control unit 108 and the image analysis unit 110 are formed by one central processing unit (CPU) or a plurality of CPUs and are operated by the loading of the program stored in a storage unit (not illustrated) provided in the image inspection device 100 by the CPU. In addition, some or all of the functions of the image inspection device 100 may be implemented by an integrated circuit typified by a digital signal processor (DSP) or a field-programmable gate array (FPGA).

The image acquisition unit 102 is an interface that acquires data of an inspection image 50 from other circuits inside or outside the device. The image acquisition unit 102 can be formed by at least one of a data input terminal, a communication interface, or a media interface, or a plurality of combinations thereof. The image acquisition unit 102 corresponds to an example of an inspection image acquisition unit.

The inspection image 50 is, for example, a captured image obtained by capturing a printed matter 130 printed by the line-head-type ink jet printing apparatus (not illustrated in FIG. 8) using a camera 132. The printed matter 130 corresponds to an example of a recorded matter. The captured image may be a gray image with uniform density described in FIG. 2 or may be a general image with an object.

The camera 132 corresponds to an example of an imaging apparatus. The imaging apparatus is an apparatus that converts an optical image into electronic image data, using an imaging element typified by a charge-coupled device (CCD) sensor or a complementary metal-oxide semiconductor device (CMOS) sensor. The imaging element may be a two-dimensional image sensor or a line sensor. In addition, the imaging element may be a color imaging element, a monochromatic imaging element, or a combination thereof.

The camera 132 may be a scanner. The scanner may be a flatbed offline scanner or an in-line sensor that is provided in the medium transport path of the ink jet printing apparatus. The term "camera" or "imaging apparatus" is construed as an image reading device that reads a target object and converts the read image into an image signal. The term "imaging" includes the concept of "reading".

For example, the image inspection device 100 acquires the inspection image 50 using the following methods: a method that directly acquires the inspection image 50 from the camera 132; a method that acquires the data of the inspection image 50 obtained by the camera 132 through a wired or wireless communication interface; and a method that acquires the data of the inspection image 50 stored in a memory card or other portable storage media from the portable storage medium through a media interface. The image inspection device 100 may include the camera 132 or may not include the camera 132.

The memory 104 is a storage unit that stores the inspection image 50 acquired through the image acquisition unit 102. The memory 104 can function as a work memory when the image analysis unit 110 performs various arithmetic operations.

The compensation position information acquisition unit 106 is an interface that acquires the compensation position information 32 from other circuits inside or outside the device. The compensation position information acquisition unit 106 may be a data input terminal or a communication interface.

The detection method selection control unit 108 performs control for switching the defect detection method to be applied in the defect detection step, using the compensation position information.

The pre-processing unit 112 performs pre-processing for the image acquired through the image acquisition unit 102 if necessary. In a case in which the inspection image 50 acquired by the image acquisition unit 102 is data of the image subjected to the pre-processing or data of the image that does not require the pre-processing, it is possible to omit the process of the pre-processing unit 112. The pre-processed inspection image subjected to predetermined pre-processing by the pre-processing unit 112 is transmitted to the region determination unit 114. In addition, the inspection image that does not require the pre-processing is transmitted from the memory 104 to the region determination unit 114.

The region determination unit 114 includes a unit 114A for determining a region in the vicinity of a compensation position which determines an arithmetic target region in the vicinity of the compensation position and a unit 114B for determining a region other than a region in the vicinity of a compensation position which determines an arithmetic target region other than a region in the vicinity of the compensation position. In a case in which the position of a target to be subjected to streak inspection belongs to the region in the vicinity of the compensation position, a process using the unit 114A for determining the region in the vicinity of the compensation position is selected. In contrast, in a case in which the position of the target to be subjected to streak inspection belongs to the region other than the region in the vicinity of the compensation position on the basis of the compensation position information, the region determination unit 114 selects a process using the unit 114B for determining the region other than the region in the vicinity of the compensation position.

The signal intensity determination unit 116 includes a difference image generation unit 140, a statistical processing unit 142, and a noise reduction unit 144. The reference image storage unit 120 stores the data of the reference image 30 that has been generated in advance. The reference image 30 is generated by capturing a reference image generating printed matter, which has been recorded in advance by the ink jet printing system according to this embodiment outputting the printed matter 130 or other image recording systems, using the camera 132 or other imaging apparatuses. In addition, the reference image 30 can be generated on the basis of image data which is used to record the printed matter 130 by the ink jet printing system. In a case in which the reference image is generated on the basis of image data for printing, the reference image may be generated during a process of processing image data in order to output a printed matter.

The difference image generation unit 140 aligns the positions of the reference image 30 and the inspection image 50 stored in the reference image storage unit 120, calculates the difference between the images, and generates a difference image which is difference image information. A storage area of the memory 104 may be used as the reference image storage unit 120. A data input terminal (not illustrated) that is used to acquire the data of the reference image 30 from the reference image storage unit 120 by the signal intensity determination unit 116 corresponds to an example of a reference image acquisition unit. Alternatively, it is understood that a data input interface for storing the data of the reference image 30 in the reference image storage unit 120 corresponds to an example of a reference image acquisition unit.

The statistical processing unit 142 statistically processes a signal of the difference image generated by the difference image generation unit 140 to generate a profile quantitatively indicating the intensity of a signal suspected as a streak or other intensity evaluation signals. The statistical processing unit 142 may include a statistical processing unit for the region in the vicinity of the compensation position which is applied to a signal in the region in the vicinity of the compensation position and a statistical processing unit for the region other than the region in the vicinity of the compensation position which is applied to a signal in the region other than the region in the vicinity of the compensation position, which are not illustrated in the drawings.

The noise reduction unit 144 performs a process of reducing noise in the signal treated by the difference image generation unit 140 and/or the statistical processing unit 142. When the difference image is generated, the noise reduction unit 144 performs the noise reduction process for the reference image 30 and/or the inspection image 50.

During the process of the statistical processing unit 142, the noise reduction unit 144 may perform the noise reduction process. The noise reduction unit 144 includes a noise reduction unit 144A for the region in the vicinity of the compensation position which performs the noise reduction process applied to a signal in the region in the vicinity of the compensation position and a noise reduction unit 144B for the region other than the region in the vicinity of the compensation position which performs the noise reduction process applied to a signal in the region other than the region in the vicinity of the compensation position.

The defect presence/absence determination unit 118 compares the intensity evaluation signal generated by the signal intensity determination unit 116 with a threshold value to determine whether there is a defect. The threshold value storage unit 122 stores the threshold value that is used for the determination process of the defect presence/absence determination unit 118. A storage area of the memory 104 may be used as the threshold value storage unit 122. The threshold value storage unit 122 can store, for example, a first threshold value that is applied to the region in the vicinity of the compensation position and a second threshold value that is applied to the region other than the region in the vicinity of the compensation position. The first threshold value and the second threshold value may be determined by a program or may be input from the operation unit 160.

The defect presence/absence determination unit 118 can determine whether there is a defect, selectively using one of the first threshold value and the second threshold value, in response to a command from the detection method selection control unit 108. The image analysis unit 110 corresponds to an example of a defect detection unit.

The information output unit 124 is an output interface that outputs information of the determination result of the defect presence/absence determination unit 118. Examples of the information of the determination result include information indicating whether there is a streak defect, information indicating the position of a streak defect, information indicating the intensity of a streak, information indicating the length of a streak, and combinations of two or more information items among them.

The image inspection device 100 may include an operation unit 160 and a display unit 162. The operation unit 160 and the display unit 162 form a user interface. Various input devices, such as a keyboard, a mouse, a touch panel, and a trackball, can be used as the operation unit 160. In addition, the operation unit 160 may be an appropriate combination thereof. Various display devices, such as liquid crystal displays, can be used as the display unit 162. The display unit 162 and the operation unit 160 may be integrally provided. For example, a touch panel may be provided on a screen of the display unit 162. The user can use the operation unit 160 to set various parameters and to input and edit various kinds of information while viewing content displayed on the screen of the display unit 162.

In addition, the display unit 162 functions as inspection result information notification means for notifying the user of the inspection result. For example, In a case in which a streak defect is detected from a printed matter, streak defect detection information indicating the detection information of the streak defect is displayed on the screen of the display unit 162.

<<Variation 1 in Compensation Position>>

Two patterns, that is, a pattern in which a defect occurs in the region in the vicinity of the compensation position and a pattern in which a defect occurs in the region other than the region in the vicinity of the compensation position have been described above. However, a larger number of patterns can be considered. For example, in a case in which the image subjected to the compensation process is used as the reference image, the region in the vicinity of the compensation position in the reference image and the region in the vicinity of the compensation position in the inspection image are likely to be separately present. It is noted that, in a case in which an input digital image is used as the reference image, the compensation position is likely to be present in the reference image due to pre-processing.

As such, in a case in which the region in the vicinity of the compensation position in the reference image and the region in the vicinity of the compensation position in the inspection image are separately present, there are four patterns of pattern 1 to pattern 4 as shown in the table of FIG. 9.

[Pattern 1] A defect is in the region in the vicinity of the compensation position on the inspection image and a defect is in the region in the vicinity of the compensation position on the reference image.

[Pattern 2] A defect is in the region in the vicinity of the compensation position on the inspection image and a defect is in the region other than the region in the vicinity of the compensation position on the reference image.

[Pattern 3] A defect is in the region other than the region in the vicinity of the compensation position on the inspection image and a defect is in the region in the vicinity of the compensation position on the reference image.

[Pattern 4] A defect is in the region other than the region in the vicinity of the compensation position on the inspection image and a defect is in the region other than the region in the vicinity of the compensation position on the reference image.

The compensation position information for each of the above-mentioned patterns may be stored in, for example, a memory and may be used in the defect detection step (Step S14). For example, in pattern 2, since a defect is in the region in the vicinity of the compensation position on the inspection image and a defect is in the region other than the region in the vicinity of the compensation position on the reference image, the probability of erroneous determination in this pattern is the highest in defect determination based on the difference image between the inspection image and the reference image. In contrast, in pattern 1 or pattern 3, robustness against noise is lower than that in pattern 4. Therefore, it is effective to perform different processes for each of the classified patterns. The invention is not limited to the configuration in which different processes are applied to four patterns. Processes using different detection methods may be applied to at least pattern 2 and pattern 4.

The concept of selecting the defect detection method in the defect detection step in the case of the four classified patterns shown in FIG. 9 is generally described as follows.

When a set of compensation positions in the inspection image is a set T and a set of compensation positions in the reference image is a set R, first to fourth position sets are defined as follows.

A set of positions that are included in the set T and the set R is referred to as the first position set.

A set of positions that are included in the set T and are not included in the set R is referred to as the second position set.

A set of positions that are not included in the set T and are included in the set R is referred to as the third position set.

A set of positions that are not included in the set T and the set R is referred to as the fourth position set.

Different defect detection methods are selected in at least the second position set and the fourth position set among the first to four position sets defined as described above.

In addition, it is preferable that the defect detection method used in the second position set has a lower correct detection performance and a higher erroneous detection avoidance performance than the defect detection method used in the fourth position set. A set of compensation positions is referred to as a compensation position set.

<<Variation 2 in Compensation Position>>

The following case can be considered as another variation in the compensation position. That is, there is a case in which a compensation position is very close to another compensation position. When this case is represented by the term "compensation positions are densely arranged", it is considered that, in the vicinity of a region in which compensation positions are densely arranged, erroneous detection is more likely to occur than that in vicinity of a region in which compensation positions are not densely arranged. Therefore, it is effective that the compensation positions which are densely arranged are treated as another pattern and different processes are performed for each pattern. In addition, the compensation positions which are densely arranged may have the same color or different colors.

An example of the case in which the compensation positions which are densely arranged have the same color is a case in which defective nozzles are densely arranged in an ink jet head that jets K ink in CMYK printing using ink of four colors, that is, cyan (C), magenta (M), yellow (Y), and black (K). An example of the case in which the compensation positions which are densely arranged have different same colors is a case in which a K defective nozzle and a C defective nozzle are densely arranged such as a case in which the position of a defective nozzle of an ink jet head that jets C ink is close to the position of a defective nozzle of an ink jet head that jets K ink.

In a case in which a plurality of compensation positions are close to each other, the degree of closeness defined as "dense arrangement" can be adjusted according to an application. For example, in a case in which the distance between the compensation nozzles in a nozzle column of a line head with a resolution of 1200 dpi is in the range of about ±3 to ±9 nozzles, this case is defined as dense arrangement.

<<Range of Vicinity of Compensation Position>>

The strict range of the compensation position treated as "the vicinity of the compensation position" can be adjusted according to an application. Basically, the range of the vicinity of the compensation position is determined according to printing resolution, the number of printing pixels used for compensation, and the imaging resolution of the imaging apparatus. The number of printing pixels used for compensation may be substituted with a compensation width which is the range of the pixels used for compensation. The imaging resolution of the imaging apparatus is synonymous with reading resolution.

A standard for the definition of the vicinity of the compensation position will be described. For example, assuming that an ink jet printing apparatus with a printing resolution of 1200 dots per inch (dpi) is used and a defective nozzle is compensated by ±3 nozzles in the vicinity of the defective nozzle, the compensation width corresponds to seven nozzles. In a case in which a printed matter output by an ink jet printing apparatus is captured by an imaging apparatus with a reading resolution of 600 pixels per inch (ppi), when positional deviation is considered during imaging, the compensation width is included in the range of 4 to 5 pixels on the captured image. Therefore, it is preferable that at least the range of about ±3 pixels from the center of the compensation position is defined as the vicinity of the compensation position. The captured image is synonymous with a read image.

In addition, it is possible to slightly widen the range in order to obtain a margin to the positional deviation of the ink jet head due to the vibration of the device during drawing or image blur caused by a modulation transfer function (MTF) of an imaging lens used in the imaging apparatus or light scattered from a sheet. For example, the vicinity of the compensation position can be set to the range of about ±4 pixels from the center of the compensation position. In a case in which the resolution of the imaging apparatus increases, the number of pixels included in the vicinity of the compensation position increases by the increment.

In a case in which the compensation positions are densely arranged, it is noted that the number of pixels included in the vicinity of the compensation position further increases. For example, in a case in which two compensation nozzles are close to each other, a range including all of the compensation widths of the two nozzles is determined to be the vicinity of the compensation positions which are densely arranged.

[Example of Configuration of Ink Jet Printing Apparatus]

Figure 10:
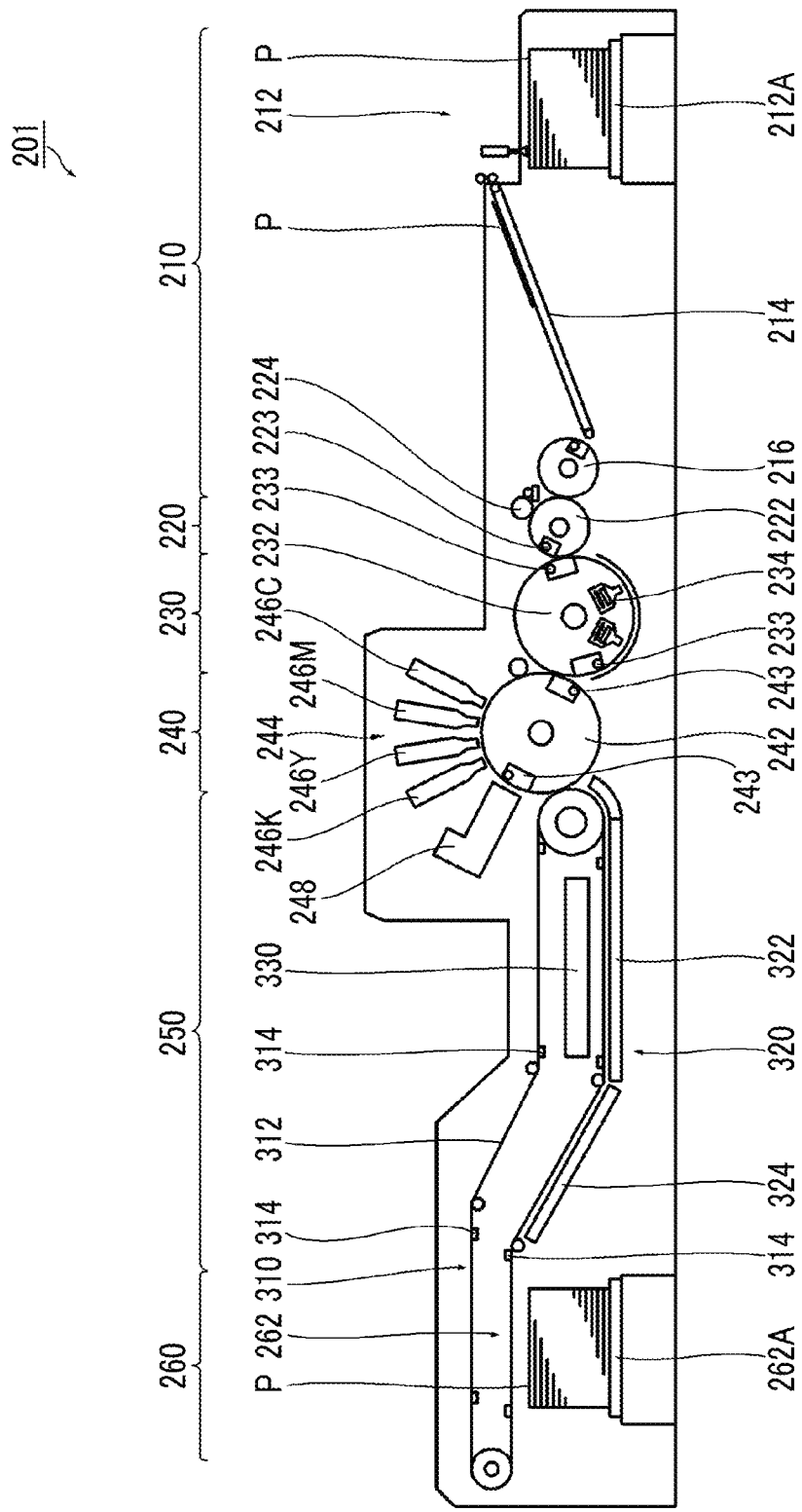
FIG. 10 is a side view illustrating the configuration of an ink jet printing apparatus according to the embodiment.

FIG. 10 is a side view illustrating the configuration of an ink jet printing apparatus 201 according to the embodiment. The ink jet printing apparatus 201 corresponds to an example a "printing apparatus". In addition, the term "printing apparatus" is synonymous with the terms, such as a printing machine, a printer, an image recording apparatus, an image formation apparatus, and an image output apparatus.

The ink jet printing apparatus 201 is a single-pass line-head-type ink jet printing apparatus that prints a color image on a flat sheet P using a line head. The ink jet printing apparatus 201 includes a sheet feed unit 210, a treatment liquid applying unit 220, a treatment liquid drying unit 230, a drawing unit 240, an ink drying unit 250, and a stacking unit 260.

The sheet feed unit 210 automatically feeds the sheets P one by one. The sheet feed unit 210 includes a sheet feed device 212, a feeder board 214, and a sheet feed drum 216. The type of sheet P is not particularly limited. For example, cellulose-based printing sheets, such as a high-quality sheet, a coated sheet, and an art sheet, can be used. The sheet P is an example of a recording medium on which an image is recorded. A plurality of sheets P are stacked in a bundle on a sheet feed base 212A.

The sheet feed device 212 takes out the sheets P which are set in a bundle on the sheet feed base 212A one by one from the top and feeds the sheets to the feeder board 214. The feeder board 214 transports the sheet P received from the sheet feed device 212 to the sheet feed drum 216.

The sheet feed drum 216 receives the sheet P fed from the feeder board 214 and transports the received sheet P to the treatment liquid applying unit 220.

The treatment liquid applying unit 220 applies a treatment liquid to the sheet P. The treatment liquid is a liquid having a function of agglutinating, insolubilizing, or thickening color material components in ink. The treatment liquid applying unit 220 includes a treatment liquid applying drum 222 and a treatment liquid applying device 224.

The treatment liquid applying drum 222 receives the sheet P from the sheet feed drum 216 and transports the received sheet P to the treatment liquid drying unit 230. The treatment liquid applying drum 222 includes a gripper 223 provided on a circumferential surface. The treatment liquid applying drum 222 is rotated with the leading end of the sheet P held by the gripper 223 such that the sheet P is wound around the circumferential surface and is transported.

The treatment liquid applying device 224 applies the treatment liquid onto the sheet P transported by the treatment liquid applying drum 222. The treatment liquid is applied by a roller.

The treatment liquid drying unit 230 dries the sheet P having the treatment liquid applied thereon. The treatment liquid drying unit 230 includes a treatment liquid drying drum 232 and a warm air blower 234. The treatment liquid drying drum 232 receives the sheet P from the treatment liquid applying drum 222 and transports the received sheet P to the drawing unit 240. The treatment liquid drying drum 232 includes grippers 233 provided on a circumferential surface. The treatment liquid drying drum 232 is rotated with the leading end of the sheet P held by the grippers 233 to transport the sheet P.

The warm air blower 234 is provided inside the treatment liquid drying drum 232. The warm air blower 234 blows warm air to the sheet P transported by the treatment liquid drying drum 232 to dry the treatment liquid.

The drawing unit 240 includes a drawing drum 242, a head unit 244, and an in-line sensor 248. The drawing drum 242 receives the sheet P from the treatment liquid drying drum 232 and transports the received sheet P to the ink drying unit 250. The drawing drum 242 includes grippers 243 provided on a circumferential surface and is rotated with the leading end of the sheet P held by the grippers 243 such that the sheet P is wound around the circumferential surface and is transported. The drawing drum 242 includes a suction mechanism (not illustrated), sucks the sheet P wound around the circumferential surface to the circumferential surface, and transports the sheet P. A negative pressure is used for the suction. The drawing drum 242 includes a plurality of suction holes provided in the circumferential surface and draws air to the inside of the drawing drum 242 through the suction holes to suck the sheet P to the circumferential surface of the drawing drum 242.

The head unit 244 includes ink jet heads 246C, 246M, 246Y, and 246K. The ink jet head 246C is a recording head that jets droplets of cyan (C) ink. The ink jet head 246M is a recording head that jets droplets of magenta (M) ink. The ink jet head 246Y is a recording head that jets droplets of yellow (Y) ink. The ink jet head 246K is a recording head that jets droplets of black (K) ink. Ink is supplied to each of the ink jet heads 246C, 246M, 246Y, and 246K from ink tanks (not illustrated) which are ink supply sources of corresponding colors through pipe lines (not illustrated).

The ink jet heads 246C, 246M, 246Y, and 246K are line heads that correspond to a sheet width and are arranged such that each nozzle surface faces the circumferential surface of the drawing drum 242. The term "sheet width" means the width of a sheet in a direction perpendicular to the transport direction of the sheet P. The ink jet heads 246C, 246M, 246Y, and 246K are arranged at regular intervals along the transport path of the sheet P by the drawing drum 242.

A plurality of nozzles which are ink jetting ports are two-dimensionally arranged on a nozzle surface of each of the ink jet heads 246C, 246M, 246Y, and 246K, which is not illustrated. The "nozzle surface" means a jetting surface in which the nozzles are formed and is synonymous with the term "ink jetting surface" or "nozzle formation surface". The two-dimensional arrangement of the plurality of nozzles is referred to as a "two-dimensional nozzle array".

Each of the ink jet heads 246C, 246M, 246Y, and 246K can be formed by connecting a plurality of head modules in the width direction of the sheet. Each of the ink jet heads 246C, 246M, 246Y, and 246K is a full-line recording head including a nozzle column that can record an image in the entire recording region of the sheet P at a prescribed recording resolution in the width direction of the sheet perpendicular to the transport direction of the sheet P, using one scanning operation. The full-line recording head is also called a page-wide head. The prescribed recording resolution may be a recording resolution that is set in advance by the ink jet printing apparatus 201 or may be a recording resolution which is selected and set by the user or a recording resolution which is automatically selected and set by a program corresponding to the print mode. The recording resolution can be, for example, 1200 dpi. In some cases, the width direction of the sheet perpendicular to the transport direction of the sheet P is referred to as a nozzle column direction of the line head and the transport direction of the sheet P is referred to as a direction perpendicular to a nozzle column.

In the case of an ink jet head having the two-dimensional nozzle array, a projected nozzle column obtained by projecting (orthographic projection) each nozzle of the two-dimensional nozzle array in the nozzle column direction can be considered to be equivalent to a column of nozzles which are arranged at substantially regular intervals at a nozzle density for achieving the maximum recording resolution in the nozzle column direction. The "substantially regular intervals" mean nearly regular intervals at which dots that can be recorded by the ink jet printing apparatus are arranged. For example, the concept of "regular intervals" includes a case in which the intervals between the nozzles are slightly different from each other, considering the movement of droplets on a medium due to errors in manufacture or landing interference. Considering the projected nozzle column (also referred to as a "substantial nozzle column"), nozzle numbers indicating the positions of each nozzle can be associated with each nozzle in the order in which the projected nozzles are arranged in the nozzle column direction.

The arrangement of the nozzles in each of the ink jet heads 246C, 246M, 246Y, and 246K is not particularly limited and various nozzle arrays can be used. For example, instead of the two-dimensional matrix array, a linear array, a V-shaped nozzle array, and a polygonal-line nozzle array, such as a W-shaped array in which the V-shaped array, which is a unit array, is repeated, can be used.

Ink droplets are jetted from the ink jet heads 246C, 246M, 246Y, and 246K to the sheet P transported by the drawing drum 242 and the jetted droplets are attached to the sheet P. In this way, an image is recorded on the sheet P.

The drawing drum 242 functions as means for moving the sheet P relative to the ink jet heads 246C, 246M, 246Y, and 246K. The drawing drum 242 corresponds to an example of relative movement means for moving the sheet P relative to the ink jet heads 246C, 246M, 246Y, and 246K. The jetting timing of each of the ink jet heads 246C, 246M, 246Y, and 246K is synchronized with a rotary encoder signal obtained from a rotary encoder provided in the drawing drum 242. The rotary encoder is not illustrated in FIG. 10 and is illustrated as a rotary encoder 382 in FIG. 11. The jetting timing is the time when ink droplets are jetted and is synonymous with droplet drop timing.

In this example, standard colors (four colors), that is, C, M, Y, and K are used. However, a combination of the ink colors and the number of colors is not limited to this embodiment. For example, light ink, dark ink, and special color ink may be added if necessary. For example, an ink jet head that jets ink of light colors, such as light cyan and light magenta, may be added or an ink jet head that jets ink of special colors, such as green and orange, may be added. Furthermore, the arrangement order of the ink jet heads of each color is not particularly limited.

An in-line sensor 248 is an image reading device that reads the image recorded on the sheet P by the ink jet heads 246C, 246M, 246Y, and 246K. The in-line sensor 248 is, for example, a line scanner using a CCD line sensor. The in-line sensor 248 corresponds to an example of an imaging apparatus. The in-line sensor 248 can function as the camera 132 described in FIG. 8.

A streak defect of a printed matter is detected on the basis of the data of the read image read by the in-line sensor 248. In addition, information about the density of the image or a jetting failure in the ink jet heads 246C, 246M, 246Y, and 246K is obtained on the basis of the data of the read image read by the in-line sensor 248.

In the ink jet printing apparatus 201, the camera 132 may be provided separately from the in-line sensor 248, which is not illustrated in the drawings. In a case in which both the in-line sensor 248 and the camera 132 are used, it is preferable that the camera 132 is provided on the downstream side of the in-line sensor 248 in the medium transport direction. For example, the camera 132 is provided at a position where the camera 132 captures an image of a printed matter after the ink drying unit 250 ends the drying process.

The ink drying unit 250 dries the sheet P on which the image has been recorded by the drawing unit 240. The ink drying unit 250 includes a chain delivery 310, a sheet guide 320, and a warm air blowing unit 330.

The chain delivery 310 receives the sheet P from the drawing drum 242 and transports the received sheet P to the stacking unit 260. The chain delivery 310 includes a pair of endless chains 312 that travel along a prescribed travel path and transports the sheet P along the prescribed transport path, with the leading end of the sheet P held by grippers 314 included in the pair of chains 312. A plurality of grippers 314 are provided in the chains 312 at regular intervals.

The sheet guide 320 is a member that guides the transport of the sheet P by the chain delivery 310. The sheet guide 320 includes a first sheet guide 322 and a second sheet guide 324. The first sheet guide 322 guides the sheet P transported through a first transport section of the chain delivery 310. The second sheet guide 324 guides the sheet transported through a second transport section behind the first transport section. The warm air blowing unit 330 blows warm air to the sheet P transported by the chain delivery 310.

The stacking unit 260 includes a stacking device 262 that receives and stacks the sheet P transported from the ink drying unit 250 by the chain delivery 310.

The chain delivery 310 releases the sheet P at a predetermined stacking position. The stacking device 262 includes a stacking tray 262A, receives the sheets P released from the chain delivery 310, and stacks the sheets P on the stacking tray 262A in a bundle. The stacking unit 260 corresponds to a sheet discharge unit.

[Configuration of System]

Figure 11:
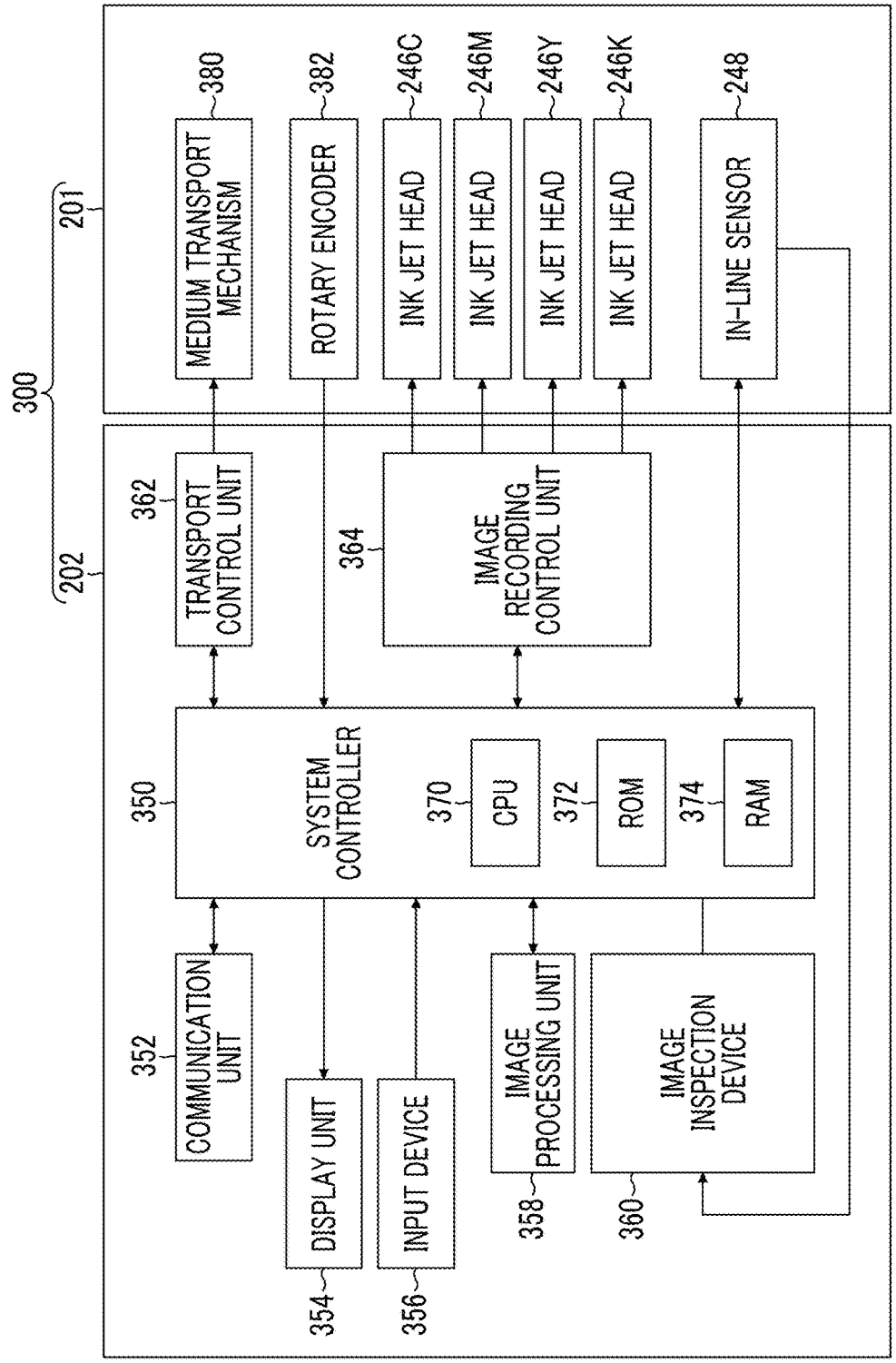
FIG. 11 is a block diagram illustrating the configuration of a main portion of a control system of the ink jet printing apparatus.

FIG. 11 is a block diagram illustrating the configuration of a main portion of a control system of the ink jet printing apparatus 201. The ink jet printing apparatus 201 is controlled by a control device 202. A system including the control device 202 and the ink jet printing apparatus 201 is referred to as an ink jet printing system 300.

The control device 202 includes a system controller 350, a communication unit 352, a display unit 354, an input device 356, an image processing unit 358, an image inspection device 360, a transport control unit 362, and an image recording control unit 364. Elements of each of the units can be implemented by one computer or a plurality of computers. That is, the control device 202 can be formed by a combination of hardware and software of the computer. In addition, some or all of the processing functions of the control device 202 may be implemented by an integrated circuit typified by a DSP or an FPGA.

The system controller 350 functions as control means for controlling the overall operation of each unit of the ink jet printing apparatus 201 and also functions as arithmetic means for performing various arithmetic processes. The system controller 350 includes a central processing unit (CPU) 370, a read-only memory (ROM) 372, and a random access memory (RAM) 374 and operates according to a predetermined program. The ROM 372 stores programs executed by the system controller 350 and various kinds of data required for control.

The communication unit 352 includes a necessary communication interface. The ink jet printing apparatus 201 is connected to a host computer (not illustrated) through the communication unit 352 and can transmit and receive data to and from the host computer. There, the "connection" includes wired connection, wireless connection, and a combination thereof. The communication unit 352 may be provided with a buffer memory for increasing a communication rate.

The communication unit 352 functions as an image input interface unit for acquiring image data indicating the image to be printed.

The display unit 354 and the input device 356 form a user interface. Various input devices, such as a keyboard, a mouse, a touch panel, and a trackball, can be used as the input device 356. In addition, the input device 356 may be an appropriate combination thereof.

An operator can perform, for example, an operation of inputting various kinds of information, such as printing conditions, other settings, and accessory information, an operation of selecting an image quality mode, an operation of editing accessory information, and an operation of searching for information, using the input device 356, while viewing content displayed on the screen of the display unit 354. In addition, the operator can check various kinds of information other than input content through the content displayed on the display unit 354.

The image processing unit 358 performs various kinds of processing, such as a conversion process, a correction process, and halftone processing, for the image data to be printed. The conversion process includes, for example, pixel number conversion, gradation conversion, and color conversion. The correction process includes density correction and non jetting correction for preventing an image defect caused by a defective nozzle from being seen. The image processing unit 358 performs a correction process on the basis of the read image obtained from the in-line sensor 248. The halftone processing is a digital halftoning process typified by a dither method or an error diffusion method.

The image inspection device 360 can have the same configuration as the image inspection device 100 described in FIG. 8. The display unit 354 shown in FIG. 13 can be used as the display unit 162 described in FIG. 8. The input device 356 shown in FIG. 13 can be used as the operation unit 160 described in FIG. 8.

The image inspection device 360 may be formed by a computer different from the control device including the system controller 350 or may be provided as a functional block of the control device including the system controller 350.

The transport control unit 362 controls a medium transport mechanism 380. The medium transport mechanism 380 includes the entire mechanism of the sheet transport unit related to the transport of the sheet P from the sheet feed unit 210 to the stacking unit 260 described in FIG. 10. The medium transport mechanism 380 includes, for example, the sheet feed drum 216, the treatment liquid applying drum 222, the treatment liquid drying drum 232, the drawing drum 242, and the chain delivery 310 illustrated in FIG. 10. The medium transport mechanism 380 includes a driving unit including a motor and a motor driving circuit as a power source (not illustrated).

The transport control unit 362 controls the medium transport mechanism 380 in response to a command from the system controller 350 such that the sheet P is transported from the sheet feed unit 210 to the stacking unit 260.

The ink jet printing apparatus 201 includes a rotary encoder 382 as means for detecting the rotation angle of the drawing drum 242 (see FIG. 10) in the medium transport mechanism 380. The jetting timing of each of the ink jet heads 246C, 246M, 246Y, and 246K is controlled according to a jetting timing signal which is generated from a rotary encoder signal output from the rotary encoder 382.

The image recording control unit 364 controls the ink jetting operation of each of the ink jet heads 246C, 246M, 246Y, and 246K in response to commands from the system controller 350. The image recording control unit 364 controls the jetting operation of each of the ink jet heads 246C, 246M, 246Y, and 246K such that a predetermined image is recorded on the sheet P transported by the drawing drum 242 on the basis of dot data of each ink color generated through the halftone processing of the image processing unit 358.

The control device 202 includes a storage device (not illustrated) such as a hard disk drive. The storage device can store the programs executed by the CPU 370 and various kinds of data required for arithmetic operations. The storage device may be provided in the control device 202 or may be connected to the control device 202 through a communication line.

<<Block Diagram Related to Image Recording Control Function of Control Device 202>>

FIG. 12 is a block diagram illustrating the function of the control device 202 related to image recording control.

The control device 202 includes a landing error measurement arithmetic unit 410, a defective nozzle information storage unit 412, a density correction coefficient calculation unit 414, a density correction coefficient storage unit 416, a density data generation unit 418, a correction processing unit 420, an ink jetting data generation unit 422, a driving waveform generation unit 424, and a head driver 426.

The landing error measurement arithmetic unit 410 performs an arithmetic process that generates, for example, data for the position of a non-jetting nozzle or a landing position error and data (density data) indicating a density distribution from the read data of the test chart read from the in-line sensor 248. The landing error measurement arithmetic unit 410 determines a nozzle with a landing position error greater than an allowable value to be a defective nozzle that jets liquid droplets in a curved line, on the basis of the data for the landing position error and sets the nozzle as the target to be disabled. A process that determines a non-jetting nozzle detected from the read data of the test chart to be a defective nozzle and disables the nozzle is performed.

Information of the defective nozzle specified on the basis of the arithmetic result of the landing error measurement arithmetic unit 410 is stored in the defective nozzle information storage unit 412.

The density correction coefficient calculation unit 414 calculates a density correction coefficient from the information of the measured landing position error or density information. The process functions of the landing error measurement arithmetic unit 410 and the density correction coefficient calculation unit 414 can be implemented by an integrated circuit, software, or an appropriate combination thereof.

The known process disclosed in, for example, JP2012-71474A can be used as the detailed content of the processes of the landing error measurement arithmetic unit 410 and the density correction coefficient calculation unit 414.

The density data generation unit 418 is signal processing means for generating initial density data of each ink color from data of an input image 440 and performs a density conversion process and a pixel number conversion process which is performed if necessary. The density conversion process includes an undercoloring process and a color conversion process.

The correction processing unit 420 is a processing unit that performs density correction using the density correction coefficient stored in the density correction coefficient storage unit 416 and performs a defective nozzle compensation process. The correction processing unit 420 performs a process that corrects an image signal for non-jetting correction, using the defective nozzle information stored in the defective nozzle information storage unit 412. The defective nozzle information corresponds to compensation position information.

The ink jetting data generation unit 422 is signal processing means including halftone processing means for converting the corrected image data generated by the correction processing unit 420 into binary or multi-valued dot image data. The ink jetting data generation unit 422 generates ink jetting data for controlling the jetting of ink from the dot image data.

The ink jetting data generated by the ink jetting data generation unit 422 is transmitted to the head driver 426 and the ink jetting operation of the ink jet head 246 is controlled. The block of the ink jet head 246 shown in FIG. 12 is a representative example of the ink jet heads corresponding to four colors. In practice, dot image data of each of C, M, Y, and K is generated and the ink jetting operation of the ink jet heads corresponding to each color is controlled.

The driving waveform generation unit 424 means for generating a driving signal waveform for driving a jetting energy generation element corresponding to each nozzle of the ink jet head 246. The jetting energy generation element is, for example, a piezoelectric element. A driving waveform signal generated by the driving waveform generation unit 424 is supplied to the head driver 426. The signal output from the driving waveform generation unit 424 may be digital waveform data or an analog voltage signal.

The head driver 426 includes an amplifier circuit and outputs a driving signal for driving the piezoelectric elements corresponding to each nozzle of the ink jet head 246 according to drawing content, on the basis of the ink jetting data and the driving waveform signal. The head driver 426 may include a feedback control system for maintaining head driving conditions.

In this way, the driving signal output from the head driver 426 is transmitted to the ink jet head 246 and ink is jetted from the corresponding nozzle. The jetting of ink from the ink jet head 246 is controlled in synchronization with the transport speed of the sheet P to form an image on the sheet P.

As described above, the head driver 426 controls the amount of ink droplets jetted from each nozzle or the jetting timing of the ink droplets, on the basis of the ink jetting data and the driving signal waveform generated through necessary signal processing including the process of the correction processing unit 420.

In this embodiment, the correction processing unit 420 performs a process of correcting a signal value required to compensate a defective nozzle for image data before halftone processing. However, correction processing unit 420 may perform the compensation process for image data after halftone processing.

In this embodiment, the compensation process of correcting output image data used for printing has been described. However, a compensation process of correcting a jetting driving signal may be used.

<<For Program Causing Computer to Function as Image Inspection Device>>

A program that causes a computer to implement an image processing function including the image inspection function described in the above-mentioned embodiment and the control function of the ink jet printing apparatus can be recorded on a computer readable medium, such as a compact disc read-only memory (CD-ROM), a magnetic disk, or other tangible and non-transitory information storage media, and the program can be provided through the information storage medium. Instead of the aspect in which the program is stored in the tangible and non-transitory information storage medium and then provided, program signals may be provided as a download service through a communication network such as the Internet.

In addition, a service may be performed which provides a portion of or the entire image processing function including the image inspection function as an application server and provides the processing function through a communication network.

This program is incorporated into the computer to cause the computer to implement the functions of the image inspection device. In addition, a portion of or the entire program for implementing printing control including the image inspection function described in this embodiment may be incorporated into a high-order control device, such as a host computer, or may be applied as an operating program of the CPU provided in the ink jet printing apparatus.

<<Advantages of Embodiment>>

(1) According to this embodiment, it is possible to prevent an error in the detection of a streak defect in the vicinity of the compensation position.

(2) The defect detection method that reduces the correct detection capability and increases the erroneous detection avoidance capability in the vicinity of the compensation position is used. Therefore, it is also possible to detect a streak defect which occurs in the vicinity of the compensation position.

(3) According to this embodiment, it is possible to appropriately inspect whether there is a defect in the printed matter 130 recorded by the ink jet printing system 300 having the non-jetting correction function.

<<For Jetting Method of Ink Jet Head>>

An ejector of the ink jet head includes a nozzle that jets a liquid, a pressure chamber that is connected to the nozzle, and a jetting energy generation element that applies jetting energy to the liquid in the pressure chamber. For a jetting method which jets liquid droplets from the nozzle of the ejector, means for generating jetting energy is not limited to a piezoelectric element and various jetting energy generation elements, such as a heating element and an electrostatic actuator, can be applied. For example, a method can be used which jets liquid droplets using the pressure of film boiling caused by the heating of a liquid by a heating element. A jetting energy generating element corresponding to the jetting method of an ink jet head is provided in a flow path structure.

<<For Recording Medium>>

The "recording medium" means a "medium" used to record an image. The "recording medium" or the "medium" is a general term of various media, such as a sheet, a recording sheet, a printing sheet, a printing medium, a typing medium, a printed medium, an image formation medium, an image-formed medium, an image receiving medium, and a medium to which liquid droplets are jetted. For example, the material or shape of the recording medium is not particularly limited. Various sheets, such as a seal sheet, a resin sheet, a film, fabric, a non-woven fabric, and other materials, may be used, regardless of the material or shape of the recording medium. The recording medium is not limited to the sheet-type medium and may be a continuous medium such as continuous paper. The sheet-type recording medium is not limited to a cut sheet which has been cut into a prescribed size in advance. The continuous medium may be cut into the sheet-type recording media with a prescribed size at any time.

<<For Recording Medium Transport Means>>

Transport means for transporting the recording medium is not limited to the drum transport type illustrated in FIG. 1 and various transport types, such as a belt transport type, a nip transport type, a chain transport type, and a pallet transport type, can be used. In addition, these types can be appropriately combined with each other.

Modification Example 1

In the above-described embodiment, as an example of the image quality correction process, the non-jetting correction parameters are applied to image data before halftone processing to correct a signal value and halftone processing is performed for the corrected image data. However, when the invention is embodied, a structure in which data after halftone processing is corrected may be used. In addition, a driving signal that is applied to the jetting energy generation element of each nozzle may be corrected.

Modification Example 2

In the above-described embodiment, an example in which the Y direction which is the scanning direction in the single pass method is the first direction and the X direction which is the nozzle column direction perpendicular to the first direction is the second direction has been described. However, the second direction may be a direction perpendicular to the first direction. In the specification, the term "perpendicular" or "vertical" includes an aspect in which the same operation and effect as those in a case in which two directions substantially intersect with each other at an angle of 90° are obtained among the aspects in which two directions intersect each other at an angle less than 90° or at an angle greater than 90°.

<<For Defective Nozzle>>

The defective nozzle includes all types of nozzles that abnormally jet ink droplets including a nozzle that intermittently jets ink droplets, such as a nozzle that splashes ink, and a nozzle that jets an ink dot with a size different from a design size, in addition to a non jetting nozzle and a nozzle that jets ink droplets in a curved line which have been described in FIG. 1. The position where the defective nozzle is compensated is also included in the concept of the "compensation application region" according to this disclosure.

<<Application of Line-Head-Type Ink Jet Printing System to Defects Other than Streak Defect>>

In the above-mentioned embodiment, an example of the streak defect in the line-head-type ink jet printing system has been described. However, the invention can be applied to a case in which defects in all types of image recording systems that compensate for the defect of an image formation element are inspected. Examples of the image recording system include an image recording system that records an image using a thermal print head and an image recording system that records an image using an LED print head.

<<For Terms>>

The term "printing apparatus" is synonymous with the terms, such as a printing machine, a printer, a typewriter, an image recording apparatus, an image formation apparatus, an image output apparatus, and a drawing apparatus.

The term "image" is construed broadly and includes a color image, a black-and-white image, a monochromatic image, a gradation image, and a uniform-density (solid) image. The "image" is not limited to a photographed image and is used as the all-encompassing term including a design, a letter, a sign, a drawing line, a mosaic pattern, a coloring pattern, and various other patterns, or appropriate combinations thereof. In addition, in some cases, the term "image" indicates a digital image.

The "image recording" includes the concept of the terms, such as image formation, printing, typing, drawing, and print. The image recording system includes the concept of the terms, such as an image formation system, a printing system, and a print system.

<<For Combinations of Embodiment and Modification Examples>>

The configurations described in the above-mentioned embodiment and the matters described in the above-mentioned modification examples may be appropriately combined with each other and some of them may be substituted.

In the above-described embodiment of the invention, the components may be appropriately changed, added, or deleted without departing from the scope of the invention. The invention is not limited to the above-described embodiment and may be variously modified by those skilled in the art within the technical scope and spirit of the invention.

EXPLANATION OF REFERENCES

- 10: line head
- 12: nozzle
- 14: nozzle column
- 20: medium
- 22: dot
- 30: reference image
- 32: compensation position information
- 50: inspection image
- 100: image inspection device
- 102: image acquisition unit
- 104: memory
- 106: compensation position information acquisition unit
- 108: detection method selection control unit
- 110: image analysis unit
- 112: pre-processing unit
- 114: region determination unit
- 114A: unit for determining region in vicinity of compensation position
- 114B: unit for determining region other than region in vicinity of compensation position
- 116: signal intensity determination unit
- 118: defect presence/absence determination unit
- 120: reference image storage unit
- 122: threshold value storage unit
- 124: information output unit
- 130: printed matter
- 132: camera
- 140: difference image generation unit
- 142: statistical processing unit
- 144: noise reduction unit
- 144A: noise reduction unit for region in vicinity of compensation position
- 144B: noise reduction unit for region other than region in vicinity of compensation position
- 160: operation unit
- 162: display unit
- 201: ink jet printing apparatus
- 202: control device
- 210: sheet feed unit
- 212: sheet feed device
- 212A: sheet feed base
- 214: feeder board
- 216: sheet feed drum
- 220: treatment liquid applying unit
- 222: treatment liquid applying drum
- 223: gripper
- 224: treatment liquid applying device
- 230: treatment liquid drying unit
- 232: treatment liquid drying drum
- 233: gripper
- 234: warm air blower
- 240: drawing unit
- 242: drawing drum
- 243: gripper
- 244: head unit
- 246: ink jet head
- 246C: ink jet head
- 246K: ink jet head
- 246M: ink jet head
- 246Y: ink jet head
- 248: in-line sensor
- 250: ink drying unit
- 260: stacking unit
- 262: stacking device
- 262A: stacking tray
- 300: ink jet printing system
- 310: chain delivery
- 312: chain
- 314: gripper
- 320: sheet guide
- 322: first sheet guide
- 324: second sheet guide
- 330: warm air blowing unit
- 350: system controller
- 352: communication unit
- 354: display unit
- 356: input device
- 358: image processing unit
- 360: image inspection device
- 362: transport control unit
- 364: image recording control unit
- 370: CPU
- 372: ROM
- 374: RAM
- 380: medium transport mechanism
- 382: rotary encoder
- 410: landing error measurement arithmetic unit
- 412: defective nozzle information storage unit
- 414: density correction coefficient calculation unit
- 416: density correction coefficient storage unit
- 418: density data generation unit
- 420: correction processing unit
- 422: ink jetting data generation unit
- 424: driving waveform generation unit
- 426: head driver
- 440: input image
- 800: print head
- 802: head module
- 820: sheet
- 830: reference image
- 832: colored region
- 834: letter
- 836: vertical line 838: horizontal line
850: inspection image
852: colored region
854: letter
856: vertical line
858: horizontal line
860: streak defect
862: compensated portion
Nz3: third nozzle
Nz8: eighth nozzle
P: sheet
S10 to S24: step of streak defect inspection method
S30 to S56: step of defect detection process

What is claimed is:

1. An image inspection method comprising:
an inspection image acquisition step of acquiring data of an inspection image obtained by capturing an image of a recorded matter recorded by an image recording system that comprises a plurality of image formation elements and performs a compensation process of compensating for a defect caused by a failure in the image formation element, using an imaging apparatus;
a reference image acquisition step of acquiring data of a reference image which is a reference for detecting a defect in the recorded matter; and
a defect detection step of comparing the data of the inspection image with the data of the reference image to determine whether there is a defect at each position of the inspection image,
wherein the defect detection step includes a process that makes a defect detection performance different in a compensation application region and a compensation non-application region other than the compensation application region, on the basis of compensation position information of the failure in the image formation element to which the compensation process has been applied,
wherein in the defect detection step, a plurality of defect detection methods with different detection performances are defined, and
the defect detection step includes a selection step of selecting a defect detection method to be applied to determine whether there is a defect at each position from the plurality of defect detection methods on the basis of the compensation position information,
wherein in a case in which a set of the compensation positions of the failure in the image formation element in the inspection image is a set T, a set of the compensation positions of the failure in the image formation element in the reference image is a set R, a set of positions that are included in the set T and the set R is a first position set, a set of positions that are included in the set T and are not included in the set R is a second position set, a set of positions that are not included in the set T and are included in the set R is a third position set, and a set of positions that are not included in the set T and the set R is a fourth position set, in the selection step, different defect detection methods are selected for at least the second position set and the fourth position set.

2. The image inspection method according to claim 1, wherein the detection performance is defect detection accuracy determined by a combination of a correct detection performance that accurately determines a defect in the recorded matter and an erroneous detection avoidance performance that avoids erroneously determining a non-defect position of the recorded matter to be a defect, and
the defect detection step includes a process that sets the erroneous detection avoidance performance in the compensation application region to be higher than the erroneous detection avoidance performance in the compensation non-application region.

3. The image inspection method according to claim 1, wherein the defect detection method includes
a region determination step of determining an arithmetic region for extracting a signal which is suspected as a defect,
a signal intensity determination step of determining intensity of the signal suspected as a defect from the arithmetic region determined in the region determination step, and
a defect presence/absence determination step of determining whether there is a defect, on the basis of the intensity of the signal determined in the signal intensity determination step, using a threshold value, and
the plurality of defect detection methods include defect detection methods in which at least arithmetic methods or parameters used in an arithmetic operation are different in at least one of the region determination step, the signal intensity determination step, or the defect presence/absence determination step.

4. The image inspection method according to claim 3, wherein the plurality of defect detection methods include defect detection methods in which the arithmetic regions determined in the region determination step have different sizes.

5. The image inspection method according to claim 3, wherein the plurality of defect detection methods include defect detection methods in which arithmetic methods used for the arithmetic operation in the signal intensity determination step or the parameters used for the arithmetic operation in the signal intensity determination step are different from each other.

6. The image inspection method according to claim 3, wherein the plurality of defect detection methods include defect detection methods in which the threshold values used in the defect presence/absence determination step are different from each other.

7. The image inspection method according to claim 3, wherein the defect presence/absence determination step includes a statistical determination process that finally statistically determines whether there is a defect on the basis of a determination data group for a defect and a non-defect determined at a plurality of positions, and
determination criteria of the statistical determination process are set to be different in the compensation application region and the compensation non-application region, on the basis of the compensation position information.

8. The image inspection method according to claim 1, wherein, among the plurality of defect detection methods, the defect detection method used for the second position set has a higher erroneous detection avoidance performance than the defect detection method used for the fourth position set.

9. The image inspection method according to claim 1, wherein the image recording system is a line-head-type ink jet printing system and the image formation element is a nozzle of a line head.

10. The image inspection method according to claim 9, wherein the compensation process of compensating for the failure in the image formation element is a non-jetting correction process.

11. The image inspection method according to claim 1, wherein the defect is a streak defect.

12. The image inspection method according to claim 1, wherein the reference image is generated by capturing an image of a reference image generating recorded matter, which has been recorded in advance by the image recording system or other image recording systems, using the imaging apparatus or other imaging apparatuses.

13. The image inspection method according to claim 1, wherein the reference image is generated on the basis of image data that is used to record the recorded matter using the image recording system.

14. An image inspection device comprising:
a first interface that acquires data of an inspection image obtained by capturing an image of a recorded matter recorded by an image recording system that comprises a plurality of image formation elements and performs a compensation process of compensating for a defect caused by a failure in the image formation element, using an imaging apparatus, wherein the first interface is formed by at least one of a data input terminal, a communication interface, or a media interface, or a plurality of combinations thereof;
a second interface that acquires data of a reference image which is a reference for detecting a defect in the recorded matter, wherein the second interface is formed by at least one of a data input terminal, a communication interface, or a media interface, or a plurality of combinations thereof; and
a detection circuit that compares the data of the inspection image with the data of the reference image to determine whether there is a defect at each position of the inspection image,
wherein the detection circuit performs a process that makes defect detection performances different in a compensation application region and a compensation non-application region other than the compensation application region, on the basis of compensation position information of the failure in the image formation element to which the compensation process has been applied,
wherein a plurality of defect detection methods with different detection performances are defined, and
the detection circuit selects a defect detection method to be applied to determine whether there is a defect at each position from the plurality of defect detection methods on the basis of the compensation position information,
wherein in a case in which a set of the compensation positions of the failure in the image formation element in the inspection image is a set T, a set of the compensation positions of the failure in the image formation element in the reference image is a set R, a set of positions that are included in the set T and the set R is a first position set, a set of positions that are included in the set T and are not included in the set R is a second position set, a set of positions that are not included in the set T and are included in the set R is a third position set, and a set of positions that are not included in the set T and the set R is a fourth position set, in the selection step, different defect detection methods are selected for at least the second position set and the fourth position set.

15. An image recording system comprising:
a plurality of image formation elements;
a processing circuit that performs a compensation process of compensating for a defect caused by a failure in the image formation element and reducing visibility of the defect;
an imaging apparatus that captures an image of a recorded matter recorded by the image formation elements;
a first interface that acquires data of an inspection image obtained by capturing the image of the recorded matter using the imaging apparatus, wherein the first interface is formed by at least one of a data input terminal, a communication interface, or a media interface, or a plurality of combinations thereof;
a second interface that acquires data of a reference image which is a reference for detecting a defect in the recorded matter, wherein the second interface is formed by at least one of a data input terminal, a communication interface, or a media interface, or a plurality of combinations thereof; and
a detection circuit that compares the data of the inspection image with the data of the reference image to determine whether there is a defect at each position of the inspection image,
wherein the detection circuit performs a process that makes a defect detection performance different in a compensation application region and a compensation non-application region other than the compensation application region, on the basis of compensation position information of the failure in the image formation element to which the compensation process has been applied,
wherein a plurality of defect detection methods with different detection performances are defined, and
the detection circuit selects a defect detection method to be applied to determine whether there is a defect at each position from the plurality of defect detection methods on the basis of the compensation position information,
wherein in a case in which a set of the compensation positions of the failure in the image formation element in the inspection image is a set T, a set of the compensation positions of the failure in the image formation element in the reference image is a set R, a set of positions that are included in the set T and the set R is a first position set, a set of positions that are included in the set T and are not included in the set R is a second position set, a set of positions that are not included in the set T and are included in the set R is a third position set, and a set of positions that are not included in the set T and the set R is a fourth position set, in the selection step, different defect detection methods are selected for at least the second position set and the fourth position set.

16. A non-transitory computer-readable tangible recording medium including a program that causes a computer to perform:
an inspection image acquisition step of acquiring data of an inspection image obtained by capturing an image of a recorded matter recorded by an image recording system that comprises a plurality of image formation elements and performs a compensation process of compensating for a defect caused by a failure in the image formation element, using an imaging apparatus;
a reference image acquisition step of acquiring data of a reference image which is a reference for detecting a defect in the recorded matter; and a defect detection step of comparing the data of the inspection image with the data of the reference image to determine whether there is a defect at each position of the inspection image, wherein the defect detection step includes a process that makes a defect detection performance different in a compensation application region and a compensation non-application region other than the compensation application region, on the basis of compensation position information of the failure in the image formation element to which the compensation process has been applied, wherein in the defect detection step, a plurality of defect detection methods with different detection performances are defined, and the defect detection step includes a selection step of selecting a defect detection method to be applied to determine whether there is a defect at each position from the plurality of defect detection methods on the basis of the compensation position information, wherein in a case in which a set of the compensation positions of the failure in the image formation element in the inspection image is a set T, a set of the compensation positions of the failure in the image formation element in the reference image is a set R, a set of positions that are included in the set T and the set R is a first position set, a set of positions that are included in the set T and are not included in the set R is a second position set, a set of positions that are not included in the set T and are included in the set R is a third position set, and a set of positions that are not included in the set T and the set R is a fourth position set, in the selection step, different defect detection methods are selected for at least the second position set and the fourth position set.

* * * * *